United States Patent
Hong et al.

(10) Patent No.: US 8,724,456 B1
(45) Date of Patent: May 13, 2014

(54) NETWORK PATH SELECTION FOR MULTI-HOMED EDGES TO ENSURE END-TO-END RESILIENCY

(75) Inventors: Bin William Hong, San Jose, CA (US); Apurva Mehta, Cupertino, CA (US); Ramanarayanan Ramakrishnan, San Jose, CA (US); Huaxiang Sun, Sunnyvale, CA (US); Prakash Kamath, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 497 days.

(21) Appl. No.: 12/881,999

(22) Filed: Sep. 14, 2010

Related U.S. Application Data

(60) Provisional application No. 61/346,328, filed on May 19, 2010.

(51) Int. Cl.
*G06F 11/00* (2006.01)

(52) U.S. Cl.
USPC .......................................................... 370/225

(58) Field of Classification Search
USPC .......... 370/216, 221, 225, 227, 238, 256, 257
See application file for complete search history.

(56) References Cited

U.S. PATENT DOCUMENTS

| | | | |
|---|---|---|---|
| 7,345,991 B1 * | 3/2008 | Shabtay et al. ............... | 370/221 |
| 7,558,219 B1 * | 7/2009 | Aggarwal et al. ............. | 370/256 |
| 8,379,511 B2 | 2/2013 | Le Roux et al. | |
| 2004/0233891 A1 | 11/2004 | Regan et al. | |
| 2006/0171323 A1 | 8/2006 | Qian et al. | |
| 2006/0182122 A1 | 8/2006 | Davie et al. | |
| 2007/0183376 A1 | 8/2007 | Arai et al. | |
| 2008/0062996 A1 * | 3/2008 | Kaippallimalil et al. .. | 370/395.1 |
| 2008/0181196 A1 | 7/2008 | Regan et al. | |
| 2009/0010258 A1 | 1/2009 | Ayoub et al. | |
| 2009/0274155 A1 | 11/2009 | Nakash | |
| 2010/0085957 A1 | 4/2010 | Elias et al. | |
| 2010/0315946 A1 | 12/2010 | Salam et al. | |
| 2011/0141945 A1 * | 6/2011 | Eriksson ....................... | 370/254 |

OTHER PUBLICATIONS

Kompella et al., "Multi-homing in BGP-based Virtual Private LAN Service," Network Working Group, Nov. 3, 2008, 26 pp.
Kompella et al., "Virtual Private LAN Service (VPLS)—Using BGP for Auto-Discovery and Signaling," Network Working Group, Jan. 2007, 27 pp.

(Continued)

*Primary Examiner* — Jae Y Lee
*Assistant Examiner* — Jean F Voltaire
(74) *Attorney, Agent, or Firm* — Shumaker & Sieffert, P.A.

(57) ABSTRACT

Techniques are described for selecting an alternate path for end-to-end service data traffic that traverses multi-homed routers that provide the service to customer networks. For example, as described herein, a router that is a member of a first multi-homing set connected to a layer two (L2) network with one of a plurality of first access links. The router advertises a status of one of the first access links to a second multi-homing set connected to the first multi-homing set with one or more core links. A core link database stores advertised status information for access links of the first and second multi-homing set. Upon a link failure, a path selector selects a core link to transport service data traffic and directs a switch module to switch to active a status a first access links that connects to a router in the first multi-homing set connected to the selected core link.

29 Claims, 17 Drawing Sheets

(56) References Cited

OTHER PUBLICATIONS

Wikipedia entry: MC LAG (Multi-Chassis link aggregation group), last modified Aug. 16, 2009, 1 pg.

Juniper Networks, "Example: Configuring Aggregated Ethernet High-Speed Uplinks Between a Virtual Chassis Access Switch and a Virtual Chassis Distribution Switch," accessed Dec. 18, 2009, 7 pp. http://www.juniper.net/techpubs/en_US/junos9.2/topics/example/interfaces-aggregated-ethernet-virtual-chassis-uplinks.html.

Muley et al., "Preferential Forwarding Status bit definition," Network Working Group, Oct. 24, 2009, 25 pp.

Junos 8.2 VPNs Configuration Guide, Chapter 15: "VPLS Overview," pp. 375-380, accessed Apr. 27, 2009, found at http://www.juniper.net/techpubs/software/junos/junos82/swconfig82-vpns/download/vpls-overview.pdf.

U.S. Appl. No. 12/577,588, by Safaa Hasan, filed Oct. 12, 2009.

* cited by examiner

NETWORK PATH SELECTION FOR MULTI-HOMED EDGES TO ENSURE END-TO-END RESILIENCY

This application claims the benefit of U.S. Provisional Application No. 61/346,328, filed May 19, 2010, which is hereby incorporated by reference in its entirety.

TECHNICAL FIELD

The disclosure relates to computer networks and, more particularly, to connections established over computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables. When forwarding an individual Ethernet frame, an ingress port of an Ethernet switch typically broadcasts the Ethernet frame to all of the other physical ports of the switch unless the Ethernet switch has learned the specific physical port through which to the destination MAC address devices is reachable. In this case, the Ethernet switch forwards a single copy of the Ethernet frame out the associated physical port.

The term "link" is often used to refer to the connection between two devices on a network. The link may be a physical medium, such as a copper wire, a coaxial cable, any of a host of different fiber optic lines or a wireless connection. In addition, network devices may define "virtual" or "logical" links, and map the virtual links to the physical links. In some cases, Ethernet links may be combined into one logical interface for higher bandwidth and redundancy. Ports of the Ethernet links that are combined in this manner are referred to as a link aggregation group (LAG) or bundle.

A virtual private local area network service (VPLS) is one example of an L2 virtual private network (VPN) service that may be used to extend two or more remote customer networks, i.e., VPLS sites, through an intermediate network (usually referred to as a provider network), such as the Internet, in a transparent manner, i.e., as if the intermediate network does not exist and the remote customer networks are instead directly connected. In particular, the VPLS transports L2 communications, such as Ethernet packets, between customer networks via the intermediate network. In a typical configuration, provider edge (PE) routers coupled the customer networks operate as ingress and egress for label switched paths (LSPs) or other tunnels that may be used as pseudowires within the provider network to carry encapsulated L2 communications as if these customer networks were directly attached to the same local area network (LAN). Such PE routers will be referred to as "members of the VPLS domain" in that they run a VPLS instance for the VPLS domain and maintain L2 state information for the VPLS service. In Label Distribution Protocol (LDP)-based VPLS networks, the PE routers use LDP as the control plane protocol for signaling the VPLS service. While VPLS is an example of a multipoint-to-multipoint service, an L2 virtual circuit or pseudowire is an example of a point-to-point service that may be used to connect two remote customer networks.

In some cases, a customer network site may be given redundant connectivity to a network through multiple PE routers, which is referred to as "multi-homing." In multi-homing, one of the multiple PE routers coupled to the customer network is chosen as the active PE router, or "designated forwarder" (DF), to send traffic to and from the customer network. The other one or more PE routers are designated as backup forwarders which can be used to send traffic to and from the customer network in the event of a network failure that would preclude the current DF from sending the traffic.

SUMMARY

In general, techniques are described for reducing delay in delivering network traffic between customer networks due to link or node failure. In particular, the techniques described herein allow one or more multi-homed routers along a path for forwarding end-to-end network traffic between the customer networks to select an alternate path in a coordinated manner. The techniques allow the multi-homed routers to coordinate switching of active/standby status destination based on a variety of types of information, such as the topology of the network, the state and active/standby status of relevant interfaces, the number of hops, priority of layer two (L2) services, the respective number of services operating on the active and standby routers, and the cause of the failure, for example.

In one embodiment, a core network may include two or more sets of multi-homed router pairs, such as a primary pair of multi-homed routers and a secondary pair of multi-homed routers. The multi-homed routers may each be provider edge (PE) routers. Each of the multi-homed routers includes a connection protection module that maintains core link condition records for each core links that interconnect the PE routers. In the event of a failure condition, the connection protection modules may use the information contained in the core link condition records, according to the techniques of this disclosure, to determine a path between customer networks that conforms to a set of path selection policies. This may help ensure that multi-homing sets of PE routers converge to a shortest forwarding path with which to emulate a direct connection between customer networks.

In general, a path selection policy specifies one or more actions for a PE router to undertake on occurrence of one or more conditions. Such conditions may include the features of the network topology, the core link conditions (including core links states and statuses of services operating over each of core links), failure of one or more PE routers, failure of one or more core links and a cause thereof, failure of one of the access links, prioritization of services of carried by one of the access links within a multi-chassis link aggregation (MC-LAG) bundle, and other factors. Actions specified by a path selection policy may include, for example, switching active/standby designation of multi-homed PE routers, selecting a different one of the core links to transport data for a service across network, and forwarding service data traffic, or other end-to-end data traffic, over an out-of-band protection-link between multi-homed routers.

The techniques may provide one or more advantages. For example, the techniques may provide end-to-end network resiliency without relying on the existence of a full mesh of connections (e.g., pseudowires) between PE routers of a core network. Rather, the techniques can be employed to provide end-to-end network resiliency in both fully-meshed and partially-meshed core network topologies. By performing the techniques of this disclosure, PE routers may ensure that service data traffic for a service (e.g., VPLS or virtual circuit), or other end-to-end data traffic, is transported over a lower-cost data path between customer networks. The techniques may enable PE routers, in some instances, to avoid unnecessarily switching active/standby designations due to link failures. Moreover, the techniques may reduce, and in some cases eliminate, traffic loss due to active/standby switching between multi-homing routers by forwarding traffic along an interchassis link.

In some embodiments, the techniques may allow PE routers to select a path after a single service failure so as to minimize an impact on other, still functioning, services. The techniques also provide for path selection convergence after a failure of multiple core links by eliminating a race condition (i.e., mutual dependency of an active/standby switch determination) that otherwise causes PE routers of multiple multi-homing sets to thrash between active/standby designations.

In one embodiment, a method includes the step of storing a plurality of access link condition records with a first router that is a member of a first multi-homing set of a plurality of routers each connected to a first layer two (L2) network with a respective one of a plurality of first access links, wherein the first multi-homing set communicates with a second L2 network using a plurality of second access links to provide a first service to the first and second L2 networks, wherein each access link condition record comprises a state field that denotes whether a corresponding one of the first access links is operational with respect to the first service and a status field that denotes whether the corresponding one of the first access links is designated as active for transporting the first service data traffic. The method further includes the step of detecting, with the first router, a failure of a service link that connects the first and second L2 networks. The method additionally includes the step of, in response to detecting the failure, applying a path selection policy with the first router to select a data path between the first and second L2 networks for the first service data traffic and to cause one of the plurality of routers in the first multi-homing set to switch a status of at least one of the first access links or second access links to active.

In another embodiment, a first router that is a member of a first multi-homing set of a plurality of routers in a layer three (L3) network each connected to a first layer two (L2) network with a respective one of a plurality of first access links to provide a first service to the first L2 network. The first router comprises an access link monitor to store a plurality of access link condition records, wherein each access link condition record comprises a state field that denotes whether a corresponding one of the first access links is operational with respect to the first service and a status field that denotes whether the corresponding one of the first access links is designated active for transporting the first service data traffic. The first router also comprises a pseudowire setup module to establish one or more core links to interconnect the plurality of routers in the first multi-homing set to one or more routers of a plurality of routers in the L3 network in a second multi-homing set, wherein each router in the second multi-homing set is connected to the second L2 network with a respective one of a plurality of second access links, wherein one of the core links has an active status to transport first service data traffic. The first router additionally comprises a core link database to store a plurality of core link condition records, wherein each core link condition record comprises a state field that denotes whether a corresponding one of the core links is operational with respect to the first service, a locally advertised field that denotes a status of one of the first access links that connects to a router in the first multi-homing set that is connected to the corresponding one of the core links, and a peer advertised field that denotes a status of one of the second access links that connects to a router in the second multi-homing set that is connected to the corresponding one of the core links. The first router also comprises a connection check module to detect failures of one or more of the core links connected to the first router and to set the state fields of core link condition records in core link database that correspond to the failed core links to a down value, a path selection policy, a plurality of interface cards to send and receive packets, and a switch module to switch a status of one of the first access links to activate to transport first service data traffic. The first router additionally comprises a path selector to apply the path selection policy, wherein the connection check module detects a failure of one of the core links, wherein the path selector, in response the failure, applies the path selection policy to the core link database to select one of the core links to activate to transport first service data traffic and to direct the switch module to switch to active a status of one of the first access links that connects to the router in the first multi-homing set that connects to the selected core link.

In another embodiment, a system comprises a first layer two (L2) network and a second L2 network. In the system, a first multi-homing set comprises a plurality of routers in a layer three (L3) network, wherein each of the plurality of routers is connected to the first L2 network with a respective one of a plurality of first access links to provide a first service to the first L2 network. In the system, a second multi-homing set comprising a plurality of routers in a L3 network, wherein each of the plurality of routers is connected to the first second 2 network with a respective one of a plurality of second access links to provide the first service to the second L2 network. A plurality of core links to interconnect the plurality of routers in the first multi-homing set with the plurality of routers in the second multi-homing set, wherein a first router in the first multi-homing set comprises a first core link database to store a plurality of core link condition records, wherein each core link condition record comprises a state field that denotes whether a corresponding one of the core links is operational with respect to the first service, a locally advertised field that denotes a status of one of the first access links that connects to a router in the first multi-homing set that is connected to the corresponding one of the core links, and a peer advertised field that denotes a status of one of the second access links that connects to a router in the second multi-homing set that is connected to the corresponding one of the core links. Upon failure of a first one of the core links, the first router selects one of the core links to activate to transport first service data traffic when the core link condition record in the first core link database corresponding to the selected core link has a locally advertised field set to active status. A second router in the second multi-homing set comprises a second core link database to store a plurality of core link condition records, and wherein, upon failure of the first one of the core links, the second router selects the core link selected by the first router to activate to transport first service data traffic when the core link condition record in the second core link database corresponding to the selected core link has a peer advertised field set to active status.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
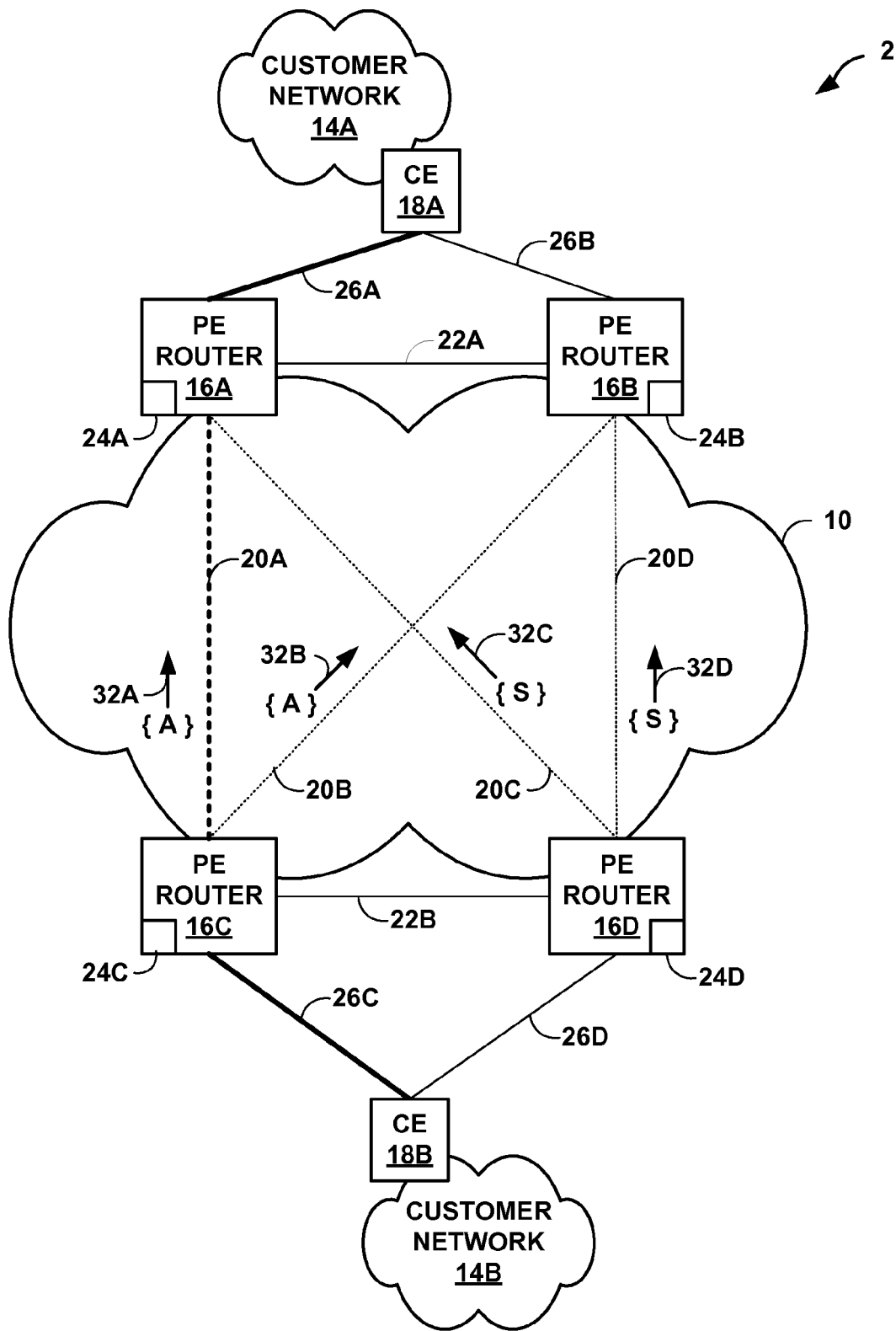
FIG. 1 is a block diagram illustrating an exemplary network system in which one or more network devices perform the techniques described in this disclosure to select a forwarding path through a network connecting a plurality of multi-homed customer networks.

FIG. 1 is a block diagram illustrating an exemplary network system 2 in which one or more network devices perform the techniques described in this disclosure to select a forwarding path through a network connecting a plurality of multi-homed customer networks. As shown in FIG. 1, network system 2 includes a network 10 and customer networks 14A-14B ("customer networks 14"). Network 10 may represent a public network that is owned and operated by a service provider to interconnect a plurality of edge networks, such as customer networks 14. As a result, network 10 may be referred to herein as a service provider (SP) network or, alternatively, as a "core network" considering that network 14 acts as a core to interconnect edge networks, such as customer networks 14. Network 10 may implement Multi-Protocol Label Switching (MPLS) forwarding and in such instances may be referred to as an MPLS network. In some instances, network 10 represents a plurality of interconnected autonomous systems, such as the Internet.

The service provider may lease portions of network 10 or provide services offering interconnection through network 10 to customer networks 14, which may lease the portions or purchase the services provided by network 10. For example, network 10 may offer a virtual circuit or a Virtual Private LAN Service (VPLS) to virtually interconnect various layer two (L2) or data link layer networks. Reference to numbered layers may refer to a particular layer of the Open Systems Interconnection (OSI) model. More information concerning the OSI model can be found in a IEEE publication entitled "OSI Reference Model—the ISO Model of Architecture for Open Systems Interconnection," by Hubret Zimmermann, published in IEEE Transactions on Communications, vol. 28, no. 4, dated April 1980, which is hereby incorporated by reference as if fully set forth herein. A virtual circuit may transparently interconnect these L2 networks, e.g., customer networks 14, to one another via service provider network 10. Network 10 may provide the virtual circuit by transparently emulating a direct connection between these various customer networks 14 such that, from the perspective of customer networks 14, each of customer networks 14 appears to directly connect to one another. As another example, a service provider may lease physical links that constitute portions of network 10 to enable customer networks 14 to interconnect.

Customer networks 14 may each represent a L2 network owned and operated by a large entity, such as a university, corporation, business, or other facility or enterprise. In some instances, a single large entity may own and operate each of customer networks 14. The entity may then contract with a service provider to lease portions of network 10 or purchase a service offered by network 10, such as a virtual circuit or VPLS, in order to transparently interconnect these customer networks 14 in the manner described above.

Each of customer networks 14 may operate according to a wide variety of network protocols, such as any of the 802.3X family of network protocols related to the Ethernet protocol, any of the 802.1X family of wireless networking protocols, an Internet Protocol (IP) protocol, an Asynchronous Transfer Mode (ATM) protocol, and a Transmission Control Protocol (TCP). Moreover, one or more of customer networks 14 may comprise a Virtual Private Network (VPN), a Large Area Network (LAN), or a Wide Area Network (WAN). Although not shown in FIG. 1 for ease of illustration purposes, each of customer networks 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Each of customer networks 14 may also include a respective one of customer edge (CE) routers 18A-18B ("CE routers 18") that reside at an edge of the customer network. CE routers 18, while discussed herein with respect to a particular network device, i.e., a router, may each represent any network device that interfaces with a network, such as network 10, to route, switch or otherwise forward network traffic directed to or originating from the network. For example, each of CE routers 18 may each represent, in certain instances, one or more of a switch, a hub, a bridge device (e.g., an Ethernet bridge), or any other L2 network device and, in some instances, L3 network devices capable of performing L2 functionality.

Provider edge (PE) routers 16A-16D ("PE routers 16") provide access to network 10 services and are coupled to ones of CE routers 18 via respective access links 26A-26D. Each of access links 26 may comprise one or more physical links. For instance, PE router 16A couples to CE router 18A via access link 26A to enable customer network 14A to reach leased portions of network 10 or to access a purchased virtual circuit, VPLS, or other service of network 10. An access link 26 that couples a particular PE router 16 to a CE router 18 is referred to herein as the "local" access link 26 from the perspective of that PE router 16. When network 10 comprises an MPLS network, one or more of PE routers 16 may be Label Edge Routers (LERs) that operate as entry and exit points to the MPLS network. In the example of FIG. 1, customer networks 14 each have redundant physical connectivity to SP network 10 through multiple PE routers 16, a technique which is referred to as "multi-homing." For instance, customer network 14A, via CE router 18A, is multi-homed to SP network 10 through PE routers 16A and 16B via respective access links 26A and 26B. In addition, customer network 14B, via CE router 18B, is multi-homed to SP network 10 through PE routers 16C and 16D via respective access links 26C and 26D.

As used herein, a "multi-homing set" refers to a set of one or more PE routers 16 to which one of customer networks 14 are multi-homed. Network system 2 includes two multi-homing sets of two PE routers interconnected over network 10 and may thus be described as having a "square" topology. One of the multi-homing sets may be designated as a primary multi-homing set to prioritize the active access link connected to that set for path selection according to the techniques of this disclosure. In some embodiments, network system 2 includes additional PE routers (not shown) that constitute additional multi-homing sets coupled to additional customer networks via corresponding CE routers.

In the illustrated embodiment, network system 2 is fully-meshed in that each PE router in a multi-homing set is coupled, via one of core links 20, to each of the PE routers in the other multi-homing set. In some embodiments, network system 2 is partially-meshed. In partially-meshed topologies, at least one of the PE routers in a multi-homing set does not couple to at least one of the PE routers in the other multi-homing set.

PE routers 16 in a multi-homing set are connected through one or more protection-links (PLs) 22A-22B ("PLs 22") to provide data transport and/or signaling within PE routers of the set. Each of PLs 22 may be, for example, a direct physical connection such as an inter-chassis link protection-link (ICL-PL) or a logical communication link that includes intermediate network elements of SP network 10, such as bridges, core routers or other provider edge routers. In the illustrated embodiment, PE routers 16A and 16B are connected via PL 22A, and PE routers 16C and 16D are connected via PL 22B. Other embodiments may include multi-homing sets of PE routers in various topological arrangements.

The active PE router 16 within a multi-homing set is coupled to the respective customer network 14 via an access link 26 having "active" status, while standby PE routers 16 within a multi-homing set couple to the customer network via an access link 26 having "standby" status. In the illustrated embodiment, PE routers 16A and 16C operate as active PE routers for the respective multi-homing sets. Accordingly, access links 26A and 26C have active status and are illustrated as heavy bolded lines, while access links 26B and 26D have standby status and are illustrated as non-bolded lines. As a result, service data traffic flows between CE routers 18 via access link 26A and 26C coupled to PE routers 16A and 16C. In addition to having a link status of either active or standby, each of access links 26 may have a link state of "up" (i.e., able to transport datagrams for a particular service) or "down" (i.e., unable to transport datagrams for a particular service).

One of PE routers 16 in a multi-homing set may determine that another PE router 16 of the set should be the active PE router, rather than the currently designated active PE router 16 within the set. Accordingly, the PE routers 16 in the multi-homing set "switch" designations, such that a different PE router is designated active, while the currently active PE router is relegated to standby status. PE routers 16 in a multi-homing set may make an active/standby switch determination for the set based on a variety of factors, including failure of one of access links 26 (i.e., the link is down), failure of the active PE router 16 of a multi-homing set, service reprioritization, and other factors. Switching active and standby designations of a multi-homing set of PE routers 16 similarly switches the active and standby characterizations of respective access links 26. For example, designating PE router 16D as active causes access link 26D to be the active access link for the multi-homing set that comprises PE routers 16C and 16D.

PE routers 16 may offer multi-homing to customer networks 14 according to a variety of mechanisms or combination of mechanisms. In one aspect, a SP network 10 offering VPLS may provide redundant VPLS connectivity to customer networks 14 via multiple PE routers 16 that select a DF using, for instance, Border Gateway Protocol (BGP). Additional details on multi-homing in BGP-based VPLS, including how a multi-homing set of PE routers 16 determine which among them is the DF, can be found in K. Kompella, "Multi-homing in BGP-based Virtual Private LAN Service," draft-kompella-12vpn-vpls-multi-homing-02.txt, IETF Internet Draft 4761, November 2008, hereby incorporated herein by reference. In another aspect, a multi-homing set of PE routers 16 may constitute a multi-chassis router with constituent PE routers assuming either a master or slave roles and communicating using an Inter-Chassis Communication Protocol (ICCP) running over an ICL-PL, such as one of PLs 22. While each of the constituent PE routers 16 of a multi-chassis router operate as packet routing devices, the master PE router is responsible for managing the master routing information and propagating this master routing information to slave PE routers in order for the multi-homing set to properly forward data packets. In addition, the master PE router selects a DF for the multi-homing set to and from the respective customer network 14.

In some embodiments, a multi-homing set of PE routers 16 presents respective access links 26 as a single logical link to the coupled customer network 14 in a form of link aggregation known as multi-chassis link aggregation group (MC-LAG) in which ends of the MC-LAG terminate at separate chassis. For example, PE routers 16A and 16B aggregate access links 26A and 26B in an MC-LAG having an associated Media Access Control (MAC) address to which L2 frames may be addressed, by CE router 18A, and sent by either access link 26A or 26B. An MC-LAG identifier identifies the MC-LAG to one of downstream CE routers 18. The PE routers 16 in the multi-homing set coordinate to set a priority within the MC-LAG for one of the respective access links 26 to a level higher or lower than a priority within the MC-LAG for the other one of the respective access links 26. The priority may depend on the respective active or standby status of the PE routers 16 in the multi-homing set. For example, access link 26A may be set to a higher priority than access link 26B when PE router 16A is the active PE router of the multi-homing set that also includes PE router 16B. In operation, one of a set of multi-homing PE routers 16 is configured in "active" status and thus functions as a designated forwarder for the MC-LAG, while other PE routers in the set are configured in "standby" status to operate as backup forwarders. In some instances, PE routers 16 configure active/standby statuses using an out-of-sync bit embedded in a Link Aggregation Control Protocol (LACP) message. Each of access links 26 in an MC-LAG may itself comprise one or more physical links aggregated in a link aggregation group (LAG).

Designation of one of PE routers 16 in a multi-homing set as active or standby may be service-specific. That is, the PE router may be set as active with respect to one or more services offered by SP network 10 while also set as standby with respect to one or more different services, or one or more different instances of the services (e.g., a different VPLS instance).

PE routers 16 may provide one or more services, such as the above-described VPLS, to transparently interconnect CE routers 18 to one another. To continue the above example, the large entity may own and operate each of customer networks 14 and purchase from the service provider a VPLS or other service, such as a Virtual Private Network (VPN) service or virtual circuit, to transparently connect each of these customer networks 14 to one another via service provider network 10. In this instance, PE router 16A may emulate a direct connection in accordance with the purchased service to both of customer networks 14 such that CE router 18A may operate as if it directly connects to CE router 18B.

To implement emulated direct connections between customer networks 14, PE routers 16 interconnect using core links 20A-20D. Each of PE routers 16 in a multi-homing set is connected to one or more of the PE routers 16 in the other multi-homing set with one of core links 20. For instance, PE router 16A is connected to PE router 16C and PE router 16D via core links 20A and 20C. Each of core links 20 may be, for example, a bidirectional pseudowire in the form of one or more label-switched paths (LSP) established by a label distribution protocol (LDP) or in the form of one or more Generic Route Encapsulation (GRE) tunnels. Core links 20 may also be direct physical connections. Thus, core links 20 may transport IP packets, Ethernet frames, ATM frames, or other datagrams issued in accordance with another communication protocol operating at various layers of the 0 SI model.

Core links 20 are illustrated as dashed lines to reflect that these links may not directly couple PE routers 16, but may represent one or more physical links and intermediate network devices (e.g., core (P) routers of network 10) that interconnect to form a physical connection for each of core links 20. Core links 20 may be bi-directional or unidirectional to suit any particular form or topology of interconnection among PE routers 16. PE routers 16 that terminate opposite ends of a core link 20 are referred to herein as peer routers with respect to that core link.

An administrator of SP network 10 may configure the purchased service or the leased portions of the network to establish core links 20, and once established, PE routers 16 may begin emulating the direct connection between CE routers 18 via one of core links 20. Each of access links 26 and core links 20 may transport service data traffic and may be referred to as a service link. For example, in the illustrated embodiment, core link 20A is a presently designated as the active service link with which packets issued by PE routers 16 traverse network 10. One of CE routers 18 may receive network traffic from their respective customer networks 14 and forward this network traffic via respective, active access links 26 to corresponding, active PE routers 16. The active PE routers 16 may then transparently forward the network traffic through SP network 10 via core links 20 in accordance with the purchased service. PE routers 16 may then deliver the received network traffic to the other one of CE routers 18 via access links 26, whereupon the CE router may forward the traffic to its respective customer network 14. In this manner, a large entity may use a service of or lease a portion of SP network 10 to interconnect disparate and often geographically separate customer networks 14.

In accordance with the techniques of this disclosure, each of PE routers 16 includes a respective one of connection protection modules 24A-24D ("CPMs 24") to enable PE routers 16 to cooperatively converge, according to a set of pre-established policies, upon a forwarding path between customer networks 14 that maintains a service connection for exchanging end-to-end data traffic between the customer networks.

Each CPM 24 advertises a local access link 26 condition for the respective one of PE routers 16. That is, CPMs 24 send messages, which may include a local link state and/or status, to other PE routers 16 to which the PE router is connected via one of core links 20. For example, as illustrated, CPM 24C of PE router 16C advertises a link status for access link 26C by sending access link advertisement 32A and 32B indicating that access link 26C is active (this condition denoted in FIG. 1 as "{A}") to PE routers 16A and 16B, respectively. In addition, an access link advertisement 32 may contain information indicating a link state (i.e., whether a link is up or down). For ease of illustration, FIG. 1 shows only those access link condition advertisements 32A-32D that issue from PE routers 16C and 16D. Additional access link advertisements may also issue from PE routers 16A and 16B. CPMs 24 may issue access links advertisements 32 using, for example, a label distribution protocol (LDP). Each one of link advertisements 32 may identify a service.

A CPM 24 for one of PE routers 16 receives access link advertisements 32 from other PE routers 16 via core links 20. A CPM 24 binds information in an access link advertisement 32 received to an identifier for the one of core links 20 over which the CPM received the advertisement to create a link condition record for the core link. A link condition record stored by one of CPMs 24 for one of PE routers 16 describes the statuses of local and remote access links 26 for the PE router, thus giving the PE router a more comprehensive awareness of the current network system 2 topology. A link condition record stored by one of CPMs 24 for one of core links 20 may comprise fields that specify (1) a locally advertised ("LA") status (i.e., a status of a local access link 26 with respect to the PE router 16 that comprises the CPM); (2) a remote peer advertised ("PA") status (i.e., a status of a remote access link 26 with respect to the PE router 16 that comprises the CPM; (3) an identifier, or key, for the core link. A link condition record describing a core link 20 may be identified using a label (e.g., an MPLS label) for the core link, an interface identifier, network addresses that specify terminating peer routers of the core link, or another identifying value.

In one example core link condition record, PE router 16A receives access link advertisement 32A via core link 20A that includes information indicating that the peer router that terminates core link 20A and thus issued the advertisement (i.e., PE router 16C) is coupled to a remote access link (i.e., access link 26C) that is active. Accordingly, CPM 24A creates, or updates, a core link condition record for core link 20A having an LA status field set to active (corresponding to the status of access link 26A), a PA status field set to active, and an identifier field set to an identifying value for core link 20A.

In some instances, CPMs 24 monitor link states of each of access links 26 and bind this information to core link condition records for those core links 20 that share one of PE routers 16 with the respective access link. For example, CPM 24C may detect that access link 26C is down and associate the down state of access link 26C with core links 20A and 20B by setting the a state value in the core link condition records for the core links to "down."

The CPMs 24 for PE routers 16 that are members of a multi-homing set additionally exchange link condition records with other member PE routers of the set using, for example, ICCP over the PL 22 for the set or by sending the records over a path through network 10. In this way, CPMs 24 build a database of link condition records for each of core links 20 that interconnect PE routers 12. CPMs 24 then use the information contained the database of core link condition records, according to the techniques of this disclosure, to determine a path between customer networks 14 that conforms to a set of path selection policies that may ensure that multi-homing sets of PE routers 16 converge on a shortest forwarding path with which to emulate a direct connection between customer networks 14.

In general, a path selection policy specifies one or more actions for a PE router 16 to undertake on occurrence of one or more conditions. Such conditions may include the network 10 topology (with nodes of the topology consisting of PE routers 16 and edges of the topology consisting of core links 20 and, in some instances, PLs 22), the link conditions (including core links 20 states and statuses of services operating over each of core links 20), failure of one or more PE routers 16, failure of one or more core links 20 and a cause thereof, failure of one of access links 26, prioritization of services of carried by one of access links 26 within an MC-LAG bundle, and other factors. PE routers 16 may be configured, or may elect, to give primary precedence to one multi-homing set of PE routers 16 over another set, which assumes secondary precedence. Primary precedence may be determined, for example, by comparison of MC-LAG identifiers for various multi-homing sets, or by a comparison of respective IP addresses of the respective PE routers 16 in the multi-homing sets. For example, a multi-homing set with the highest value for an MC-LAG identifier may be designated as primary. Path selection policies may include policy conditions that account for a precedence. Actions specified by a path selection policy may include, for example, designating a different one of PE routers 16 within a multi-homing set as the active PE router for the set (i.e., switching active/standby designation), selecting a different one of core links 20 to transport data for a service across network 10, and forwarding service data traffic, or other end-to-end data traffic, over one of PLs 22. By forwarding traffic over one of PLs 22, these techniques may reduce, and in some cases eliminate, traffic loss due to active/standby switching between sets of multi-homing PE routers 16 by reducing switching latency.

In one example, CPM 24A applies a set of one or more policies to a link condition database and other information known by CPM 24A to cause PE routers 16A and 16B to switch the active/standby designation of the routers. That is, CPM 24A determines that one or more core link condition records in the database satisfy (i.e., trigger) the conditions of one or more of the path selection policies. CPM 24A therefore undertakes the actions specified by the one more triggered policies.

By performing the techniques of this disclosure in the manner described above, PE routers 16 comprising respective CPMs 24 may ensure that service data traffic for a service, or other end-to-end data traffic, is transported over lower-cost data path between customer networks 14. Moreover, the techniques may enable PE routers 16, in some instances, to avoid unnecessarily switching active/standby designations due to link failures. In instances in which active/standby designations are service-specific, the techniques may allow PE routers 16 to select a path after a single service failure so as to minimize an impact on other, still functioning, services. The techniques also provide for path selection convergence after a failure of multiple core links 20 by potentially avoiding a race condition (i.e., mutual dependency of an active/standby switch determination) that otherwise causes PE routers 16 of multiple multi-homing sets to thrash between active/standby designations.

Figure 2:
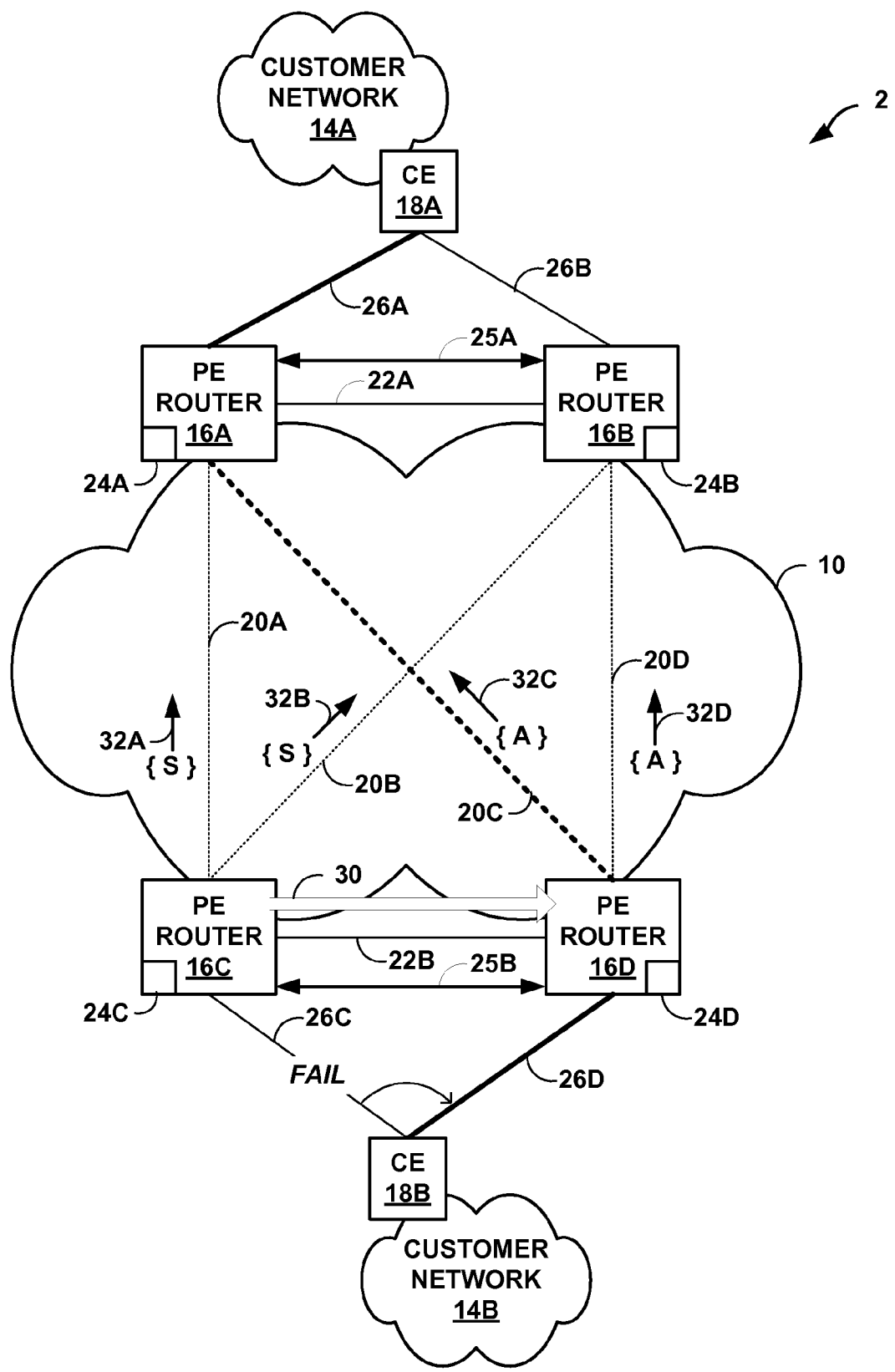
FIG. 2 is a block diagram illustrating an exemplary operation of the network devices to select, in accordance with the described techniques, a path through the exemplary network system of FIG. 1 after a failure of an access link.

FIG. 2 is a block diagram illustrating an operation of CPMs 24 of PE routers 16 to select a path through exemplary network system 2 of FIG. 1 after a failure of access link 26C. After the state of access link 26C transitions to "down" (i.e., access link 26C fails), PE router 16C detects the new state of the link and stores the state. In addition, PE router 16C sends access link state message 30 via, e.g., ICCP, to PE router 16D. The access link state message includes information that indicates the down state of access link 26C. PE routers 16C and 16D, operating as a multi-homing set for CE router 18B, decide to switch the active/standby designations for the PE routers. That is, PE router 16C switches to standby, while PE router 16D switches to active. As a result, access link 26C switches to a standby status and access link 26D switches to active status (illustrated by a bolded line). In some instances, a master one of PE routers 16C and 16D decides whether to switch the active/standby designations and informs the slave PE router of the switch decision using, for example, an ICCP message.

In accordance with the techniques of the current disclosure, the active/standby switch causes respective CPMs 24C and 24D of PE routers 16C and 16D to update the core link condition records for core links 20 by modifying the LA fields to account for the change in local access link status for each of the core links. PE routers 16C and 16D exchange updated core link condition records using record exchange messages 25B.

CPMs 24C and 24D of PE routers 16C and 16D detect the active/standby switch, and CPM 24C sends access link advertisements 32A and 32B, indicating that access link 26C is in a standby status (this condition denoted in FIG. 2 as "{S}"), to PE routers 16A and 16B, respectively. In addition, CPM 24D of PE router 16D sends access link advertisements 32C and 32D, indicating that access link 26D is now active (denoted in FIG. 2 as "{A}"), to PE routers 16A and 16B, respectively. PE routers 16A and 16B receive the link advertisements and CPMs 24A and 24B update the core link condition records for core links 20 by modifying the PA fields to account for the change in remote access link status for each of the core links In addition, PE routers 16A and 16B exchange updated core link condition records using record exchange messages 25B. Record exchange messages 25B may be exchanged, for example, via an inter-chassis control protocol (ICCP), such as when PE routers 16A, 16B reside in a common chassis. As a result, each of PE routers 16 has up-to-date data that reflects state/status of the various core links 20 and access links 26 of network system 2. PE routers 16 may use PLs 22 to reduce switching latency.

CPMs 24 apply path selection policies to the up-to-date core link condition records to determine whether to select a different one of core links 20 to carry end-to-end data traffic between the two multi-homing sets comprising PE routers 16A-16B and PE routers 16C-16D, respectively. Specifically, path selection policies direct CPMs 24 to select, if possible, a core link 20 having a core link condition record in which both the PA field value and LA field value indicate an active link. That is, CPMs 24, in accordance with the path selection policies, select core link 20C that couples the two active routers (in this instance, PE routers 16A and 16D) within the multi-homing sets. In some embodiments, CPMs 24A and 24D operating as agents within active PE routers 16A and 16D select core link 20C in accordance with the techniques described above. In some embodiments, one of PE routers 16 within each multi-homing set is a master PE router 16 for the set, and, in such embodiments, the CPM 24 for the master PE router 16 for the set selects core link 20C in accordance with the techniques described above.

In some instances, failed access link 26C is the only access path from CE router 18B to PE router 16C. In such instances, failure of access link 26C may cause PE router 16C to tear down core links 20A and 20B and set the states to down in the core link condition records for these core links Path selection policies in CPMs 24 prevent the CPMs from selecting either of core links 20A and 20B as the active core link because these core links are incapable of transporting service data traffic in such a manner as to transparently connect customer network 14.

By performing the above-described techniques, CPMs 24 for PE routers 16 in a multi-homing set acquire core link condition records from other CPMs 24 for PE routers 16 in a different multi-homing set. This enables the CPMs 24 to perform path selection according to a set of path selection policies in a coordinated manner and thereby may enable PE routers 16 to avoid unnecessary switching and intra-multi-homing set data traffic while, in some instances, achieving an optimal data path between CE routers 18 for service or other end-to-end data traffic.

Figure 3A:
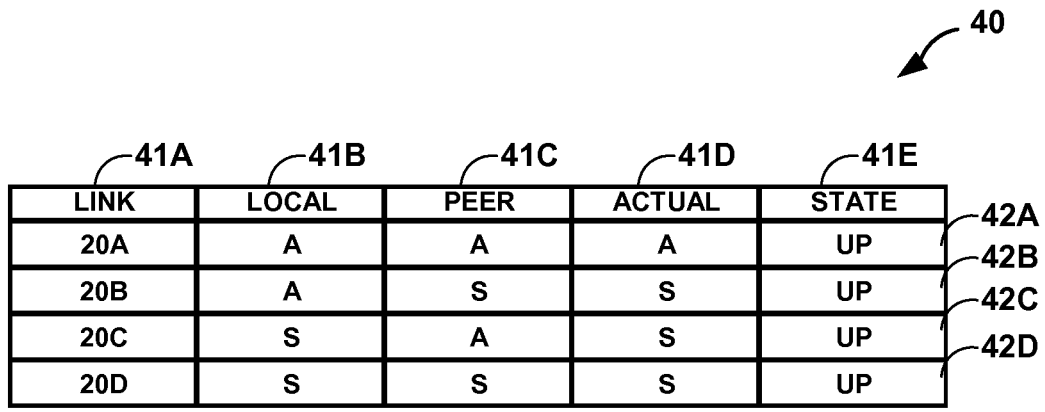
FIGS. 3A-3B illustrate a core link condition records table.

FIG. 3A illustrates core link condition records table 40 comprising core link condition records 42A-42D ("core link condition records 42") that each represent a link condition for a respective one of core links 20 of network 10 of FIG. 1.

Core link condition records table 40 and core link condition records 42 include link field ("LINK") 41A to identify the core link 20 described by the record, locally advertised field ("LOCAL") 41B to describe a status of an access link 26 that, like the described core link 20, is connected to a particular PE router 16, peer advertised field ("PEER") 41C to describe a status of an access link 26 that is advertised by a peer PE router for the described core link 20, actual status field ("ACTUAL") 41D to describe whether the described core link 20 is active, and state field 41E to denote the up/down condition of the described core link 20.

The illustrated embodiment of core link condition records table 40 describes core links 20 from a perspective of PE router 16C that maintains core link condition records table 40. That is, locally advertised field 41B values for core link condition records 42 describe a status of access links 26C and 26D coupled to respective PE routers 16C and 16D. Peer advertised field 41C values for core link condition records 42 describe a status of access links 26A and 26B coupled to respective PE routers 16A and 16B. PE router 16C populates peer advertised fields 41C with access link status information in access link advertisements received from other peer routers to which the remote access links 26A, 26B are coupled.

As one example, core link condition record 42A identifies core link 20A as "20A." According to core link condition record 42A, from a perspective of either PE routers 16C or 16D, core link 20A has a locally advertised status of active, i.e., access link 26C is active. In addition, core link 20A has a peer advertised status of active, i.e., access link 26A is active. Core link 20A is active in its actual status and has an "UP" state.

Figure 3B:
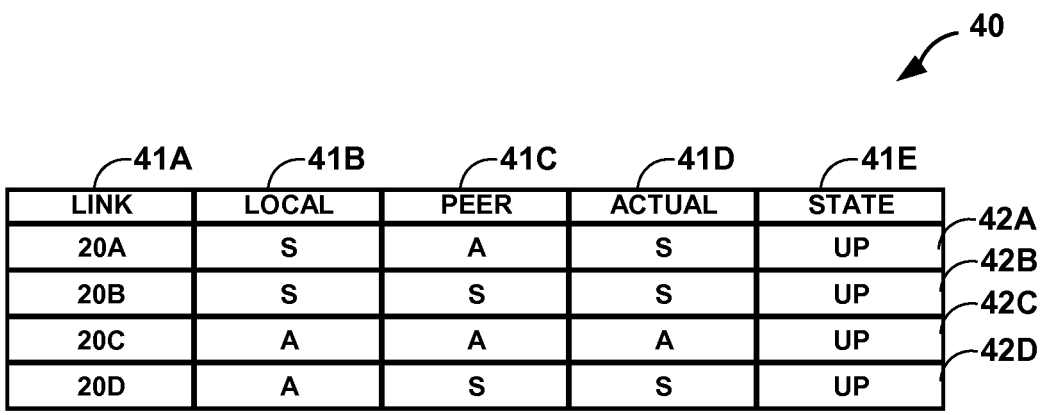

FIG. 3B illustrates the core link condition records table 40 of FIG. 3A, as modified by CPMs 24C and 24D, after access link 26C has failed, PE routers 16C and 16D have performed an active/standby switch, and PE routers 16C and 16D have advertised updated access link advertisements 32, as described above with respect to FIG. 2.

Because PE routers 16C and 16D have performed an active/standby switch, values for local field 41B in link conditions records 42 are similarly switched. However, values for peer field 41C remain unchanged. Path selection policies cause CPMs 24C and/or 24D to select core link 20C (corresponding to core link condition records 42C) by directing the CPMs to select the one of core links 20 having a core link condition record 42 in which both the locally advertised value and the peer advertised value are active. Core link 20C satisfies this criteria. Upon selecting core link 20C, CPMs 24C and 24D set the actual state field 41D for core link condition record 42C to active to cause PE routers 16C and 16D to use core link 20C to transport end-to-end data traffic over network 10.

Figure 4:
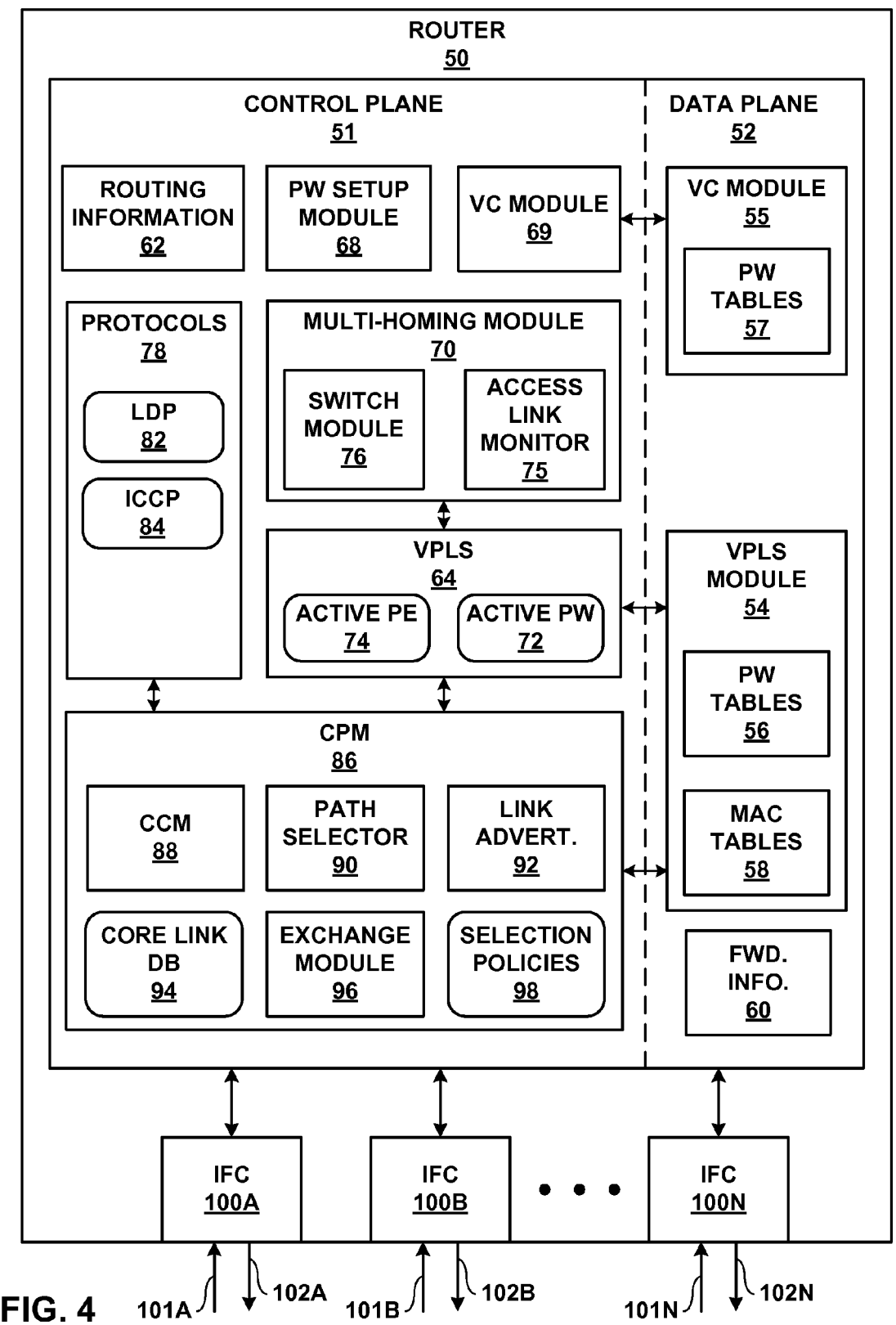
FIG. 4 is a block diagram illustrating in detail a network device that performs the path selection techniques in accordance with the techniques of this disclosure.

FIG. 4 is a block diagram illustrating in detail a router 50 that performs the path selection techniques for end-to-end data traffic in accordance with the techniques of this disclosure. Router 50 may comprise a PE router substantially similar to any of PE routers 16 of FIG. 1. Router 50 includes interface cards 100A-100N ("IFCs 100") that receive control packets and data packets via inbound links 101A-101A N ("inbound links 101A") and send control packets and data packets via outbound links 102A-102N ("outbound links 102"). IFCs 100 are typically coupled to links 100, 101 via a number of interface ports. Router 50 also includes a control plane 51 that determines routes of received packets and a data plane 52 that forwards the packets accordingly via IFCs 100. Router 50 may directly couple to other PE routers in a network via one or more inter-chassis link protection link connected to IFCs 100.

Control plane 51 maintains routing information 62. Routing information 62 describes the topology of a network and, in particular, routes through the network. Routing information 62 may include, for example, route data that describes various routes within a network, and corresponding next hop data indicating appropriate neighboring devices within the network for each of the routes. Control plane 51 generates and maintains forwarding information 60 within data plane 52 based on routing information 62. In one embodiment, control plane 51 generates forwarding information 60 in the form of a radix tree to map packet information (e.g., header information having destination information and/or a label stack) to next hops and ultimately to interface ports of IFCs 100.

Data plane 52 represents hardware and logic functions that provide high-speed forwarding of network traffic. Data plane 52 maintains forwarding information 60 for each VPLS or virtual circuit established by router 50 to associate network destinations with specific next hops and the corresponding interface ports. In general, when router 50 receives a data packet on a pseudowire of a given VPLS via one of inbound links 101, data plane 52 identifies an associated next hop for the data packet by traversing forwarding information 53 based on information (e.g., labeling information) within the packet. Data plane 52 forwards the data packet on one of outbound links 102 to the corresponding next hop in accordance with forwarding information 60 associated with the VPLS or virtual circuit. At this time, data plane 52 may push and/or pop labels from the packet to forward the packet along a correct pseudowire.

Control plane 51 also includes a VPLS module 64 (illustrated as "VPLS 64") that performs L2 learning, e.g., learning of customer device MAC addresses from inbound PWs and association of those customer MAC addresses with corresponding outbound PWs and output interfaces.

Control plane 51 additionally includes virtual circuit module 69 ("VC module 69") to implement virtual circuit services by maintaining virtual circuit mappings between pseudowires and access links connected to router 50. In various embodiments, control plane 51 may have either or both of VPLS module 64 and virtual circuit module 69.

Data plane 52 includes a VPLS module 54 capable of communicating with VPLS module 64. VPLS module 50 maintains pseudowire tables 56 ("PW tables 56") and MAC tables 58 for each VPLS established by router 50. For example, VPLS module 54 maintains MAC tables 58 to reflect state information learned via L2 communications. VPLS 64 of control plane 51 includes active pseudowires 72 to store identifiers for the pseudowires to be used to reach VPLS-remote routers for a VPLS. VPLS 64 may associate pseudowires identified in active pseudowires 72 with learned MAC addresses to populate PW tables 56 and establish a forwarding path for packets received by router 50 from a source MAC address. Embodiments of router 50 that do not provide VPLS services may not include VPLS module 54.

Data plane 52 additionally includes VC module 55 that maintains pseudowire tables 57 ("PW tables 57") for virtual circuits established by router 50 using VC module 69, where PW tables 57 map pseudowires to access links. VC module 69 of control plane 51 creates a mapping between a pseudowire for a virtual circuit and the access link for the pseudowire and installs the mapping to PW tables 57. When one of IFCs 100 receives a packet on an access link or a pseudowire for a virtual circuit, VC module 55 identifies the appropriate outbound interface for the packet in PW tables 57 such that the packet is forwarded via the corresponding pseudowire or access link for the virtual circuit. Embodiments of router 50 that do not provide virtual circuit services may not include VC module 55.

Pseudowire setup module 68 ("PW setup module 68") outputs control-plane messages to establish pseudowires between router 50 and other PE routers in a network. PW setup module 68 may signal the other PE routers using a label distribution protocol, such as LDP. PW setup module 68 then communicates with VPLS module 54 to update the one of pseudowire tables 56 associated with the VPLS within VPLS module 54. PW setup module 68 may alternatively communicate a pseudowire established to VC module 69 for creating a mapping between the pseudowire and an access link for one or more virtual circuits.

VPLS module 54 included in data plane 52 performs MAC address learning to automatically update portions of forwarding information 60 for each VPLS established by router 50. As part of data plane 52, VPLS module 54 is invoked when router 50 receives data packets on the pseudowires (PWs) established by router 50 for any of the PE routers in the network that are members of a VPLS. VPLS module 54 performs MAC address learning and updates the one of MAC tables 58 associated with the VPLS to initially record associations between the PWs connected to router 50 and the source MAC addresses of the VPLS customer devices from which the data packets were received on the PWs. For example, the one of MAC tables 58 records PW numbers that identify the PWs connected to router 50 and records MAC addresses that identify the source customer devices attached to the first AS of the data packets transmitted over the PWs. In effect, router 50, a L3 device, learns associations between MAC address and pseudowires (which are mapped to ports), much as a L2 switch learns associations between MAC addresses and ports. Forwarding information 60 may represent a virtual port binding and bridging table. In this sense, the router is acting as a virtual L2 switch to provide VPLS service.

Multi-homing module 70 in control plane 51 coordinates router 50 and one or more other PE routers to multi-home a customer site that is a member of a VPLS or a participant in a virtual circuit to the service provider network. In such instances, the customer site has multiple redundant connections to PE routers, including router 50, of the service provider network. Multi-homing module 70 coordinates with other PE routers of the multi-homing set to determine an active PE router for the set that operates as a designated forwarder (DF) for the set with respect to the VPLS or virtual circuit. The active PE router sends data traffic to and from the remote customer site. A PE router that is not a DF is designated in standby and operates as a backup PE router for the set. Active provider edge router 74 ("Active PE 74") of VPLS 64 is a data structure that identifies currently active PE routers for each VPLS established by router 50. Access link monitor 75 of multi-homing module 70 monitors states and statuses of access links that connect router 50 to CE routers of customer sites, i.e., local access links of router 50. In addition, access link monitor 75 stores and maintains state and status information for other access links connected to a multi-homing set for a VPLS or virtual circuit in access link condition records for the service. Multi-homing module 70 advertises local access link states to other PE routers in the multi-homing set. Switch module 76 of multi-homing module 70 modifies an active/standby status of router 50 responsive to access link monitor 75 determining that an access link is down, responsive to prompting from another PE router that specifies another PE router as a currently active PE router, or responsive to a directive from connection protection module 86. Switch module 76 sets active PE 74 to an identifier for the currently active PE router in a multi-homing set for the VPLS 64 service instance or virtual circuit. Switch module 76 may also send active/standby switch directives and/or advertisements to other PE routers in the multi-homing set.

Router 50 comprises a connection protection module (CPM) 86 to perform the techniques of this disclosure to select a forwarding path for end-to-end data traffic for a VPLS or virtual circuit established by router 50. CPM 86 may represent any one of CPMs 24 of FIG. 1.

Core link database 94 ("core link DB 94") of CPM 86 maintains a set of core link condition records for pseudowires in PW tables 56. Core link database 94 may comprise one or more tables, lists, or other data structures stored in a main memory or other computer-readable storage medium. For example, core link database 94 may comprise a table having core link condition record entries for each pseudowire in a particular VPLS or virtual circuit established by router 50. In some instances, core link database 94 includes one or more tables substantially similar to core link condition records table 40 of FIGS. 3A-3B. Core link database 94 may include a table for each VPLS instance in which router 50 is a member.

As described with respect to link conditions records table 40 of FIGS. 3A-3B, a core link condition record for a pseudowire indicates an up/down state for the pseudowire and additionally indicates locally advertised (LA) and peer advertised (PA) statuses for the pseudowire.

Switch module 76, upon performing an active/standby switch for router 50, updates local core link condition records in core link database 94. In particular, switch module 76 updates locally advertised statuses for pseudowires for which router 50 is a local connection for the multi-homing set for a VPLS or virtual circuit, i.e., for pseudowires that router 50 terminates.

CPM 86 comprises connectivity check module 88 ("CCM 88") monitors the states of pseudowires in PW tables 56 of VPLS 54 using label distribution protocol 82 ("LDP 82"). In some embodiments, CCM 88 uses test request-reply messages sent to pseudowire peers using a communication protocol to monitor the pseudowire states. If a pseudowire is no longer capable of transporting packets, CCM 88 determines this incapacity and sets a state in the core link condition record in core link database 94 for that pseudowire to "down."

CRM 86 further comprises exchange module 96 and link advertiser 92 ("link advert. 92") to exchange link condition information with other routers. Exchange module 96 detects modifications to core link database 94 and sends modified core link condition records to other member routers of a multi-homing set for a VPLS or virtual circuit established by router 50. In addition, exchange module 96 receives core link condition records sent by other member routers of the multi-homing set and updates core link database 94 in accordance with the received records. In the illustrated embodiment, exchange module 96 sends and receives core link condition records to/from other routers using ICCP 84 over an inter-chassis link protection link. In some embodiments, exchange module 96 uses another communication protocol and/or another communication link to exchange core link condition records with other routers. In some embodiments, exchange module 96 periodically exchanges core link condition records, stored by core link database 94, with other routers.

Link advertiser 92 sends access link advertisements to remote routers, i.e., routers that are members of a VPLS but are not members of a multi-homing set for the VPLS in which router 50 is also a member. Access link advertisements indicate an active/standby status for access links connected to routers in a multi-homing set. Link advertiser 92 may send access link advertisements using LDP 82, Border Gateway Protocol (BGP), Interior Gateway Protocol (IGP), Link Aggregation Control Protocol (LACP), or some other message type. Access link advertisements may additionally include a VPLS identifier, an MC-LAG identifier for an MC-LAG of which router 50 is a member chassis, and/or a pseudowire identifier.

Link advertiser 92 detects changes to core link database 94 and sends access link advertisements that include updated local advertisement data to remote routers. For example, upon determining that switch module 76 has updated a core link condition record for a VPLS or virtual circuit for a pseudowire to reflect a router 50 switch from active to standby for the service, link advertiser 92 sends an access link advertisement to the pseudowire peer router that indicates that the local access link for the pseudowire is set to standby. As a result, the pseudowire peer router receives an indication that router 50 is operating as a standby router for the multi-homing set for the VPLS or virtual circuit. In some embodiments, link advertiser 92 periodically sends access link advertisements to remote routers.

Link advertiser 92 additionally receives link advertisements from remote routers via pseudowires and updates core link database 94 to account for link condition information therein. Link advertisements received from other routers via a pseudowire indicate a peer advertised (PA) status for the access link connected to the peer router for the pseudowire. By updating core link database 94 with PA statuses received in access link advertisements, link advertiser 92 may ensure core link database 94 provides an accurate representation of a topology of a network system, including pseudowires, access links, and PE routers, that includes router 50.

Selection policies 98 of CPM 86 is a set of one or more policies that determine, for router 50, a path through a network to one or more other member routers of a VPLS or endpoints of a virtual circuit. Each policy in selection policies 98 includes a policy condition and a policy action that CPM 86 undertakes upon satisfaction of the conditional. A policy condition may include multiple sub-conditions logically joined using one or more binary or unary operators (e.g., AND, OR, NOR, and the like). Exemplary policy conditions may relate to a particular service (identified, e.g., by a VPLS-id or a virtual circuit identifier), quality of service, the active/standby status of an access link with respect to a particular service, the active/standby status of router 50, an up/down state of an access link or a core link (e.g., a pseudowire), the presence or absence of an inter-chassis link protection link, whether a multi-homing set (in which router 50 is a member) for a VPLS or virtual circuit is designated as primary or secondary, an MC-LAG identifier, a service priority, whether data traffic for a service is in transit, the number of services operational on respective active and standby PE routers, the number of forwarding hops, and/or core link condition record field values in core link database 94 that denote LA, PA, and AS statuses for pseudowires that interconnect PE routers providing the service. For example, a policy condition for one of selection policies 98 may specify the following: "PW1 LA=A AND PW1 PA=A". This condition is satisfied when PW1 (pseudowire 1) has an associated core link condition record with LA and PA values that both indicate A (active).

Exemplary actions for various ones of selection policies 98 may include performing an active/standby switch for router 50 and, by extension, access links connected to router 50, selecting a particular pseudowire to carry end-to-end data traffic for a VPLS or virtual circuit, and installing a forwarding entry in forwarding information 60 to cause router 50 to send data traffic to another member-router of a multi-homing set over an inter-chassis link protection-link.

Path selector 90 of CPM 86 applies selection policies 98 to core link database 94 and, in some instances, other status information stored by router 50 to determine whether one or more conditions of various ones of selection policies 98 are satisfied and to undertake associated actions when the conditions are satisfied. In accordance with selection policies 98, path selector 90 may select a particular pseudowire to carry end-to-end data traffic for a service for a multi-homing set in which router 50 is a member. Path selector 90 sets an active pseudowire for the service in active pseudowires 72 to cause router 50 to forward end-to-end data traffic for the service over the selected pseudowire. In some instances, path selector 90 may select a non-local pseudowire, that is, a pseudowire that is terminated by another member-router of the multi-homing set, rather than router 50. In such instances, path selector 90 may install a forwarding entry in forwarding information 60 or otherwise cause router 50 to forward data traffic for the service to the router that terminates the selected pseudowire. In some instances, path selector 90 directs switch module 76 to perform an active/standby switch to set the router that terminates the selected pseudowire to "active."

Figure 5:
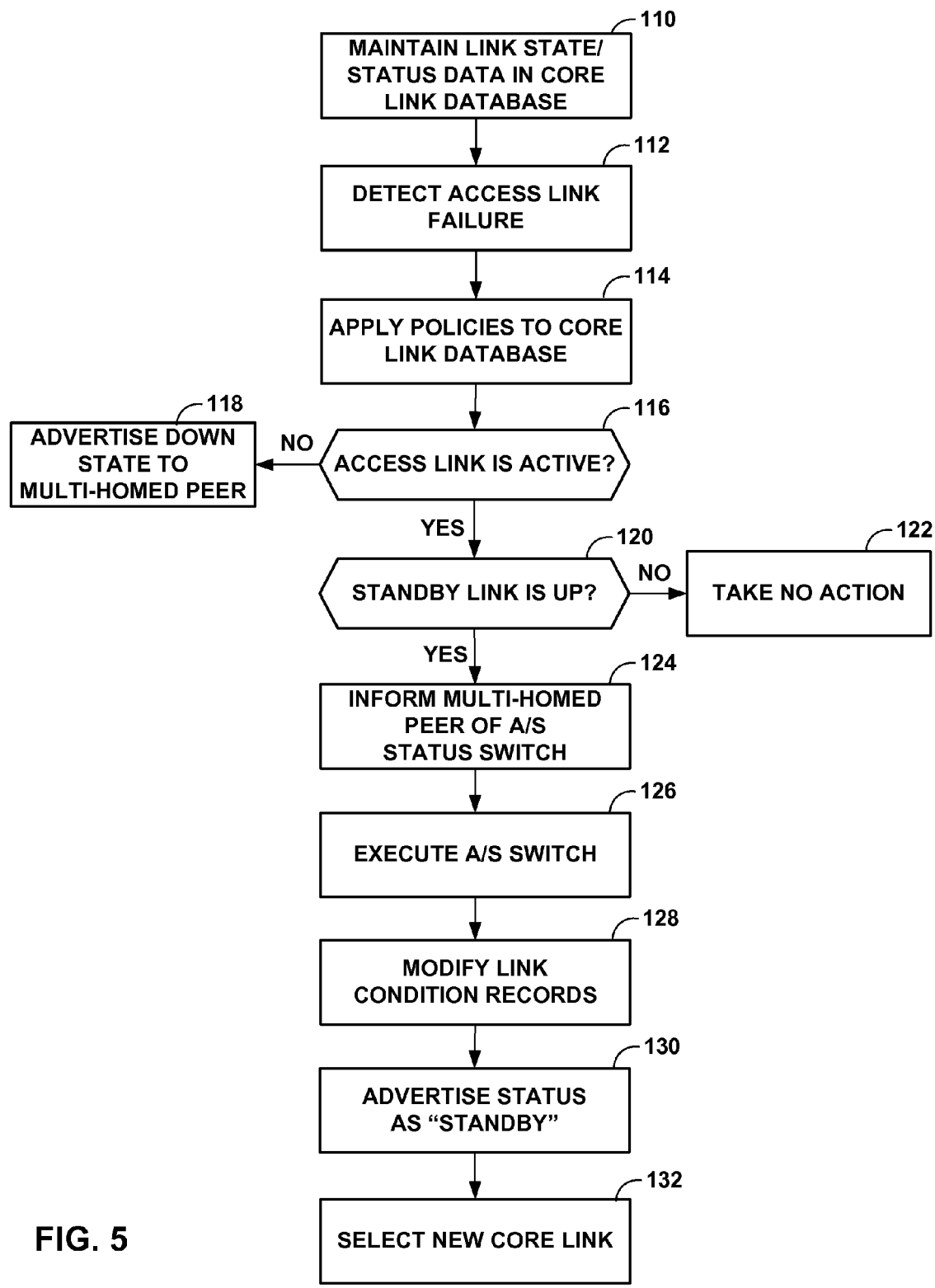
FIG. 5 is a flowchart illustrating an exemplary operation by the network device of FIG. 4 to select a forwarding path through the network system of FIG. 1 upon failure of an access link.

FIG. 5 is a flowchart illustrating an exemplary operation by PE router 16C to select a forwarding path through network system 2 of FIGS. 1-2 upon failure of access link 26C. The exemplary operation is described with respect to exemplary router 50 of FIG. 3. Steps of the exemplary operation described may be performed by elements of router 50 in an ordering that differs from the illustrated ordering.

Elements of connection protection module 86, including link advertiser 92, exchange module 96, and connection check module 88, receive link condition information from access link monitor 75 and other PE routers 16 of network system 2. These elements update core link database 94 to maintain an up-to-date representation of a topology of network system 2 (110).

Access link monitor 75 of router 50 determines that access link 26C is no longer capable of transporting service data for a service, e.g., a VPLS (112), and sets a status for that access link to down. Upon the determination by access link monitor 75 that access link 26C has failed, path selector 90 of CPM 86 applies selection policies 98 to core link database 94 to determine one or more appropriate path selection actions that elements of CPM 86 are to perform as a result of the failure of access link 26C (114).

In this example, one or more of selection policies 98 condition action according to whether access link 26C is set to active status (116). If access link 26C is set to standby (NO branch of 116), multi-homing module 70 sends an access link state message that indicates the down state of access link 26C to PE router 16D (118). If access link 26C is set to active (YES branch of 116), however, selection policies 98 additionally condition according to whether the standby link, access link 26D, is up (i.e., operational with respect to the service) (120). If not, path selector 90 does not modify a forwarding path for the service (122).

If the standby link is up, however (YES branch of 120), path selector 90 directs (in accordance with selection policies 98) multi-homing module 70 to perform an active/standby switch for the service. Switch module 76 sends PE router 16D a message that include information indicative of the pending active/standby switch (124). In addition, switch module 76 executes the switch (126) to set access link 26C and PE router 16C to standby and updates the active PE router 74 to PE router 16D for the service. Switch module 76 modifies core link condition records in core link database 94 to account for the switch (128). That is, switch module 76 sets a locally advertised (LA) status for locally connected core links 20A and 20B to standby and sets a LA status for core links 20C and 20D to active. Link advertiser 92 detects the updated link condition records and sends access link advertisements 32A and 32B to advertise the standby status for access link 26C (130).

Finally, path selector 90 selects core link 20C to carry service traffic (132) because, after the modifications by switch 76, a core link condition record associated with core link 20C in core link database 96 has both LA status and PA status set to active. In this instance, one or more of selection policies 98 specify selection of the one of core links 20 of network system 2 that has both LA status and PA status set to active as the active core link for service. Path selector 90 may update active pseudowire 72 set core link 20C as the active transport link for the service (e.g., the VPLS).

Figure 6A:
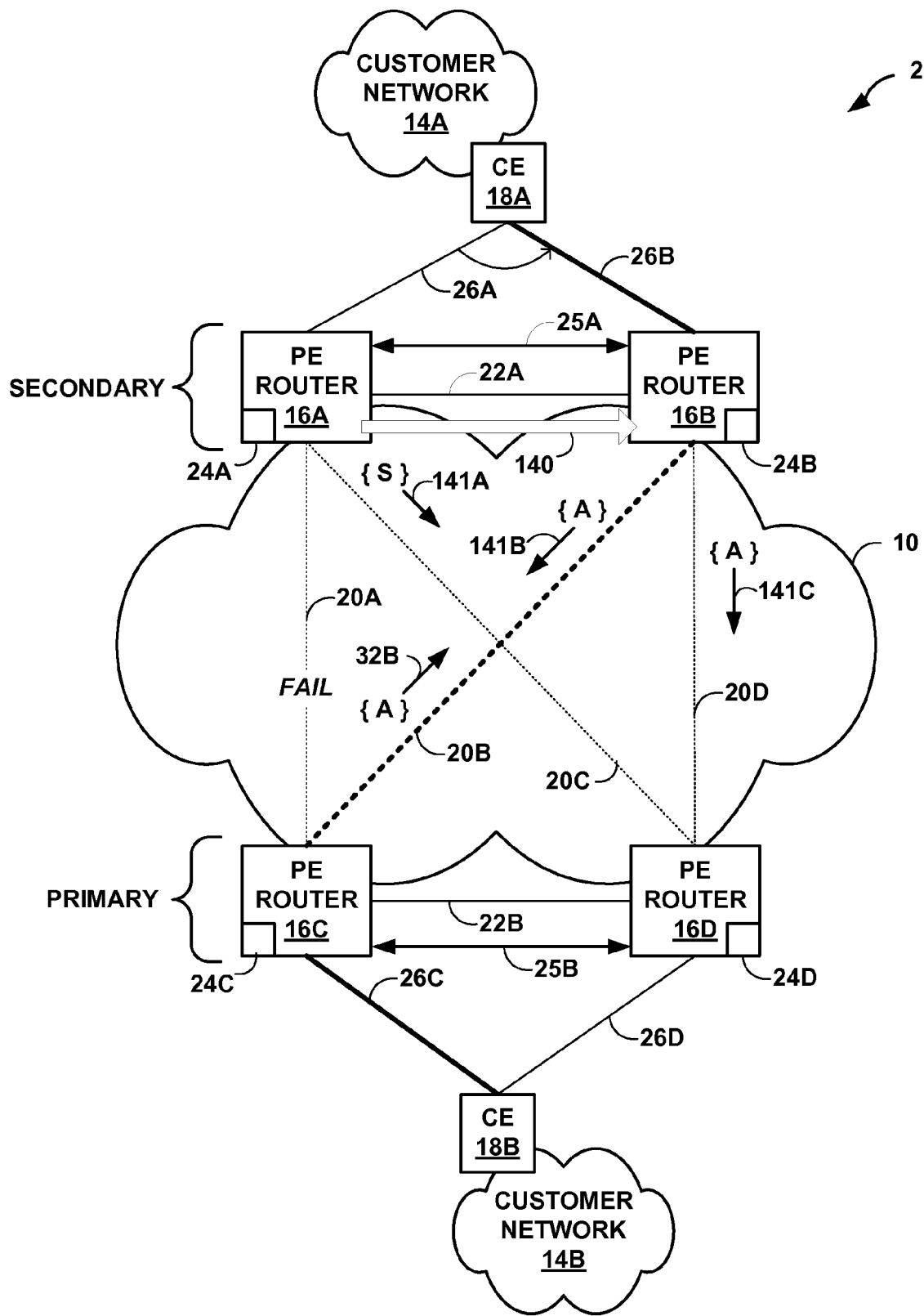
FIGS. 6A-6C are block diagrams illustrating an operation of the network devices of FIG. 1 to select, in accordance with the techniques of this disclosure, a service data path through the network system of FIG. 1 after a failure of a core link.

FIG. 6A is a block diagram illustrating an operation of CPMs 24 of PE routers 16 to select, in accordance with the techniques of this disclosure, a service data path through exemplary network system 2 of FIG. 1 after a failure of core link 20A. In the illustrated embodiment, PE routers 16A and 16B of a multi-homing set for the service have a primary designation while PE routers 16C and 16D of another multi-homing set for the service have a secondary designation.

Initially, end-to-end data traffic for a service traversed a forwarding path that included access link 26A, core link 20A, and access link 26C. CPM 24A of PE router 16A detects a failure of core link 20A and sets the state field value for the core link condition record associated with core link 20A to down. In addition, CPM 24A exchanges the updated core link condition record with PE router 16B using record exchange messages 25B. In accordance with specified path selection policies, CPM 24A, as an element of PE router 16A that is a member of a secondary multi-homing set for the service, queries the core link condition records for core links 20 to determine, first, whether one of core links 20 is operational (i.e., up state) and has PA set to active. If so, CPM 24A selects that core link for the service path. If no core links 20 are peer advertised as active, CPM 24A then determines whether one of core links 20 has LA set to active and, if so, selects that core link for the service path. If no core links 20 have LA or PA set to active, CPM 24A may select any one of core links 20 that has an up state.

In the illustrated embodiment, CPM 24A finds that the core link condition records for core links 20 indicate core link 20B has PA set to active, for access link 26C is the active link for the remote multi-homing set for the service (from the perspective of CPM 24A). CPM 24A therefore selects core link 20B as a transport link for the service. Because core link 20B is locally connected to PE router 16B, CPM 24A sends PE router 16B switch directive 140 and PE routers 16A and 16B perform an active/standby switch to actively couple CE router 18A to PE router 16B for the service via newly active access link 26B. In addition, both PE router 16A and 16B advertise updated statuses for core links 20B-20D by sending access link advertisements 141A-141C.

In accordance with specified path selection policies, CPM 24C, as an element of PE router 16C that is a member of a primary multi-homing set for the service, queries the core link condition records for core links 20 to determine, first, whether one of core links 20 is operational (i.e., up state) and has LA set to active and. If so, CPM 24C selects that core link for the service path. If no core links 20 are peer advertised as active, CPM 24C then determines whether one of core links 20 has PA set to active and, if so, selects that core link for the service path. If no core links 20 have LA or PA set to active, CPM 24C may select any one or core links 20 that has an up state.

In the illustrated embodiment, CPM 24C finds that the core link condition records for core links 20 indicate core link 20B has LA set to active, for access link 26C is the active link for the local multi-homing set for the service (from the perspective of CPM 24C). As a result, CPM 24C selects core link 20B to operate as a transport link for the service.

In some embodiments, a network system 2 topology may cause selection path policies to specify PE routers 16A and 16B as well as PE routers 16C and 16D to perform active/standby switches as a result of a link failure. In such instances, the primary multi-homing set alone (i.e., PE routers 16C and 16D) performs an active/standby switch to avoid a race condition that may otherwise result in thrashing. Designation of a primary multi-homing set may be based on, for example, MC-LAG identifiers for the multi-homing sets.

By advertising access link statuses across network 10 and applying path selection policies in the manner described above, PE routers 16A and 16B of a secondary multi-homing set for a service operate in parallel to converge upon core link 20B as a transport link for the service along with PE routers 16C and 16D of a primary multi-homing set for the service. In instances where PE routers 16C and 16D of the primary multi-homing set for the service are unable to select one or core links 20 that has an up state and either PA or LA set to active, the PE routers select one of core links 20 that has an up state despite a standby PA or LA status.

Figure 6B:
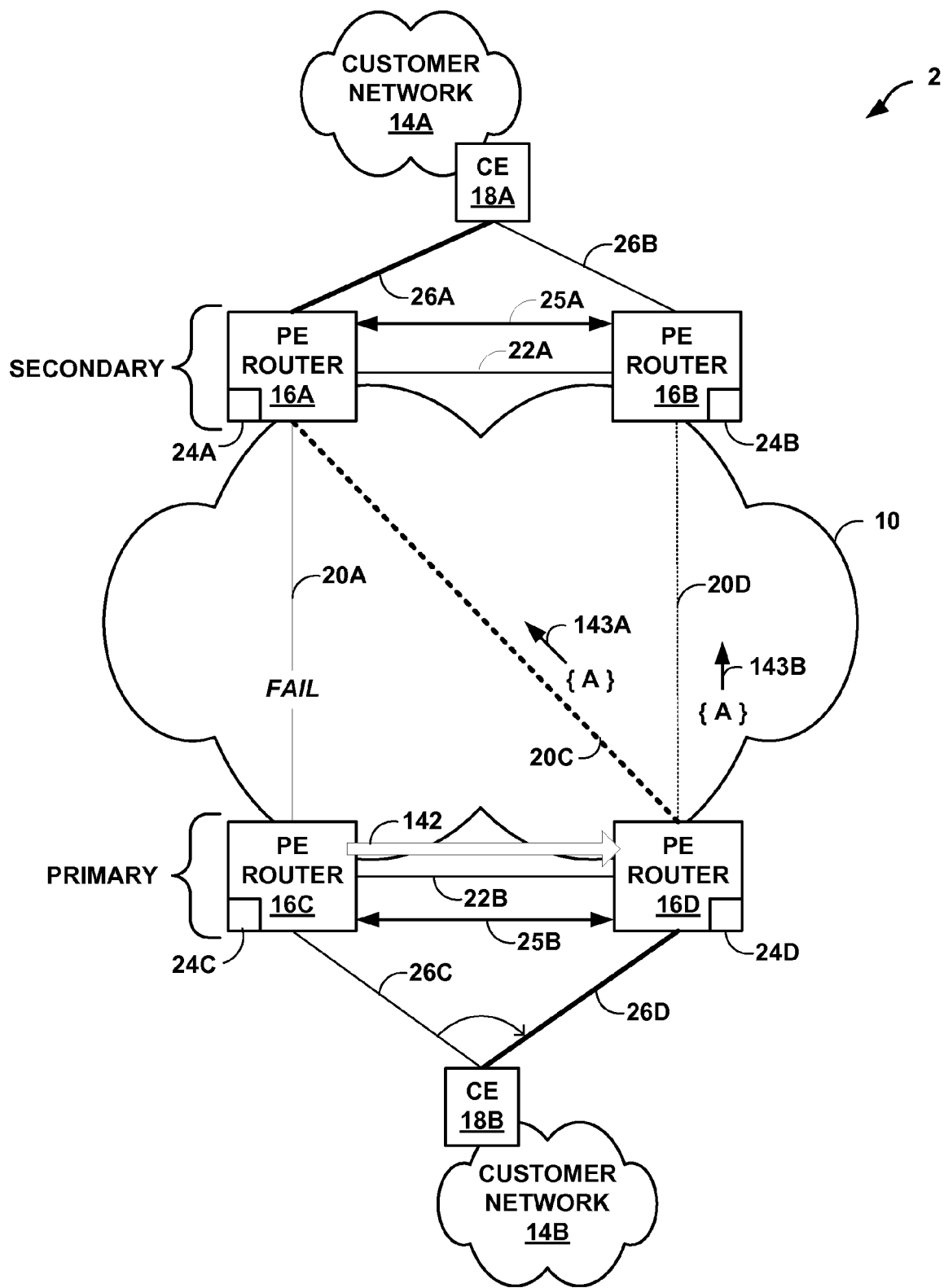

FIG. 6B is a block diagram illustrating an operation of CPMs 24 of PE routers 16 to select, in accordance with the techniques of this disclosure, a service data path through exemplary network system 2 of FIG. 1, modified to remove core link 20B, after a failure of core link 20A. In the illustrated embodiment, PE routers 16A and 16B of a multi-homing set for the service have a secondary designation while PE routers 16C and 16D of another multi-homing set for the service have a primary designation.

Initially, end-to-end data traffic for a service traversed a forwarding path that included access link 26A, core link 20A, and access link 26C. CPM 24A of PE router 16A detects a failure of core link 20A and sets the state field value for the core link condition record associated with core link 20A to down. In addition, CPM 24A exchanges the updated core link condition record with PE router 16B using record exchange messages 25B. CPM 24A performs the path selection techniques described above with respect to FIG. 6A to select a new one of core links 20 to transport end-to-end data traffic for the service.

In the illustrated embodiment, PE routers 16B and 16C do not have an interconnecting core link. CPM 24A finds that the core link condition records for core links 20 indicate that none of core links 20 have PA status set to active, for access link 26C at an initial state is the active link for the remote multi-homing set for the service (from the perspective of CPM 24A). CPM 24A therefore queries core link condition records for core links 20 that have LA status set to active. CPM 24A determines core link 20C satisfies this condition and therefore selects core link 20B as a transport link for the service.

CPM 24C also performs the path selection techniques described above with respect to FIG. 6A to select a new one of core links 20 to transport end-to-end data traffic for the service. Because there is no core link connecting PE router 16B and 16C and core link 20A has failed, there are no core link condition records for core links 20 having PA status set to active. As a result, CPM 24C next queries core link condition records for core links 20 having LA status set to active and finds core link 20C. CPM 24C therefore selects core link 20C as a transport link for the service. Because core link 20C is locally connected to PE router 16D, CPM 24C sends PE router 16D switch directive 142 and PE routers 16C and 16D perform an active/standby switch to actively couple CE router 18B to PE router 16D for the service via newly active access link 26D. In addition, PE router 16D advertises updated local statuses for core links 20C-20D by sending access link advertisements 143A-143B.

By advertising access link statuses across network 10 and applying path selection policies in the manner described above to the illustrated network system 2 topology, PE routers 16A and 16B of a secondary multi-homing set for a service operate in parallel to converge upon core link 20B as a transport link for the service along with PE routers 16C and 16D of a primary multi-homing set for the service.

Figure 6C:
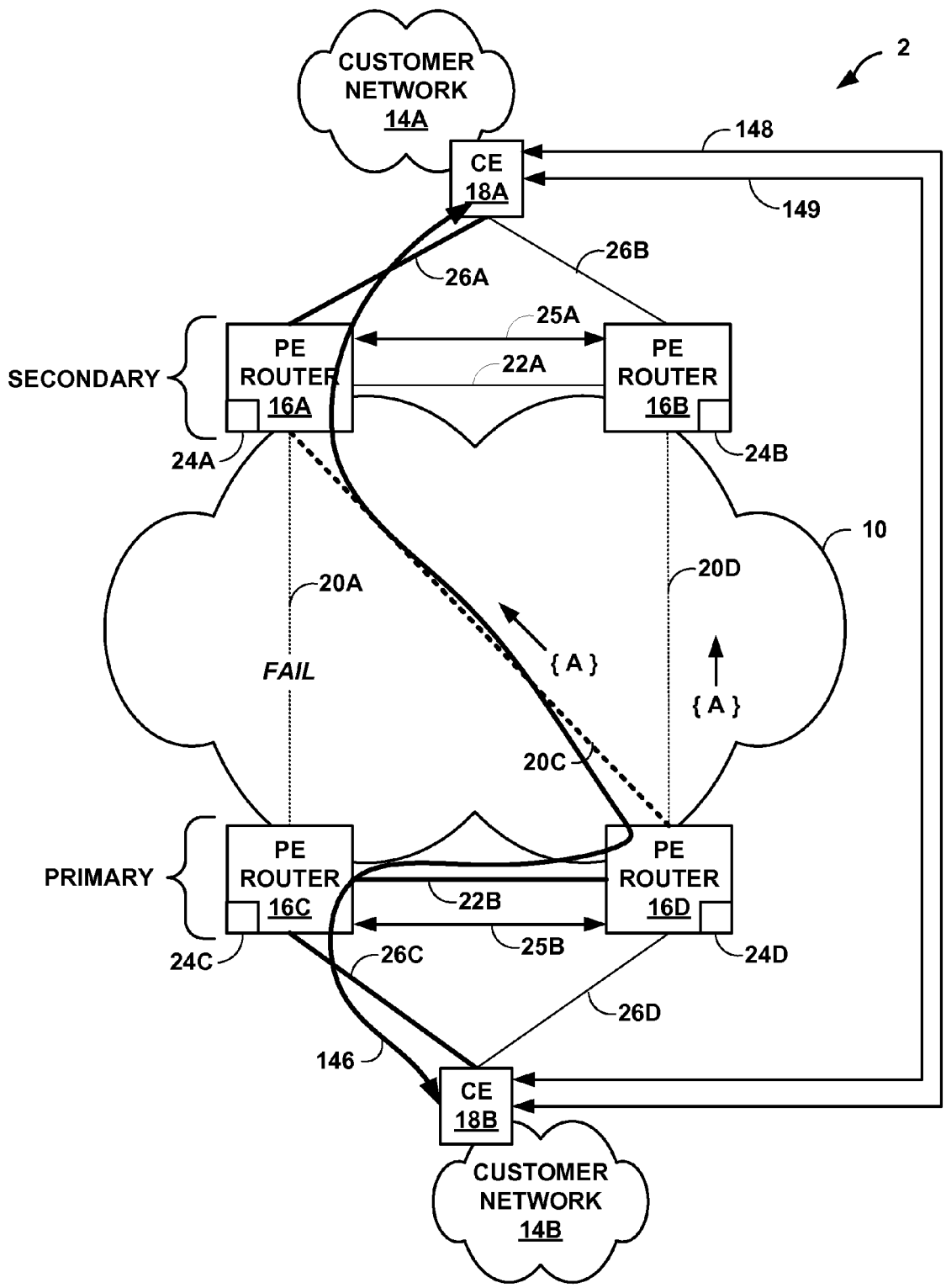

FIG. 6C is a block diagram illustrating an operation of CPMs 24 of PE routers 16 to select, in accordance with the techniques of this disclosure, a service data path through exemplary network system 2 of FIG. 1, modified to remove core link 20B, after a failure of core link 20A. In the illustrated embodiment, PE routers 16A and 16B of a multi-homing set for the service have a secondary designation while PE routers 16C and 16D of another multi-homing set for the service have a primary designation.

PE routers 16A-16D cooperate to provide end-to-end services 148 and 149 to customer networks 14 via CE routers 18. Initially, service 148 and service 149 data traffic traversed a forwarding path that included access link 26A, core link 20A, and access link 26C. As described below, services 148 and 149 may in some instances utilize different constituent links of core link 20A, e.g., core link 20A and 20A' (not shown). CPM 24A of PE router 16A detects a transport failure of core link 20A for service 148 and sets the state field value for the core link condition record associated with core link 20A and service 148 to down. In addition, CPM 24A exchanges the updated core link condition record with PE router 16B using record exchange messages 25B. CPM 24A performs the path selection techniques described above with respect to FIG. 6B to select core link 20C to transport service data traffic.

When the provisioned services 148 and 149 comprise virtual circuits, the services require separate core links. In such instances, core link 20A represents two separate core links 20A and 20A' (not shown) for the respective services, and core links 20C represents another two separate core links 20C and 20C' (not shown) for the respective services upon application of path selection techniques by CPMs 24.

CPM 24C also performs the path selection techniques described above with respect to FIG. 6B to select core link 20C as a transport link for the service. Path selection policies stored by CPM 24C specify service 149 has a higher priority than service 148. Path selection policies stored by CPM 24C also direct CPM 24C to perform an active/standby switch as a result of a transport failure of a core link for a service in one of three circumstances. First, CPM 24C may perform an active/standby switch when the service has a higher priority than other services running over the active access link and when the higher priority service is also operational on the standby one of access links 26C-26D. Second, CPM 24C may perform an active/standby switch when the higher priority service is also operational on the standby one of access links 26C-26D. Third, CPM 24C may perform an active/standby switch in a circumstance where services have the same priority based on a simple comparison of the number of services operating on access link 26C versus operating on access link 26D.

In the illustrated embodiment, because service 149 has a higher priority than service 148, CPM 24C does not perform an active/standby switch, for such a switch may interrupt service 149 data traffic. Instead, the path selection policies direct CPM 24C to forward service 148 data traffic 146 via protection-link 22B (illustrated in bold as part of the forwarding path) to maintain the end-to-end service 148 connection. PE router 16C continues to send service 149 data traffic along a forwarding path that included access link 26A, core link 20A, and access link 26C. These techniques may reduce, and in some cases eliminate, traffic loss due to failure of core link 20A by causing PE router 16D to forward traffic via protection-link 22B.

In some embodiments, path selection policies may direct CPMs 24 to forward service data traffic via a protection-link whenever the service has particular quality of service requirements, such as no data loss, that preclude PE routers 16 from performing an active/standby switch and possibly losing a portion of service data traffic as a result. In some embodiments, path selection policies of CPMs 24 may cause an active/standby switch determination based on a comparison of a number of service links in an up state on respective access links for a multi-homing set that includes multiple PE routers 16. For example, a path selection policy condition an active/standby switch upon the standby link for a service running fewer additional service than the failed active link for a service.

Figure 7A:
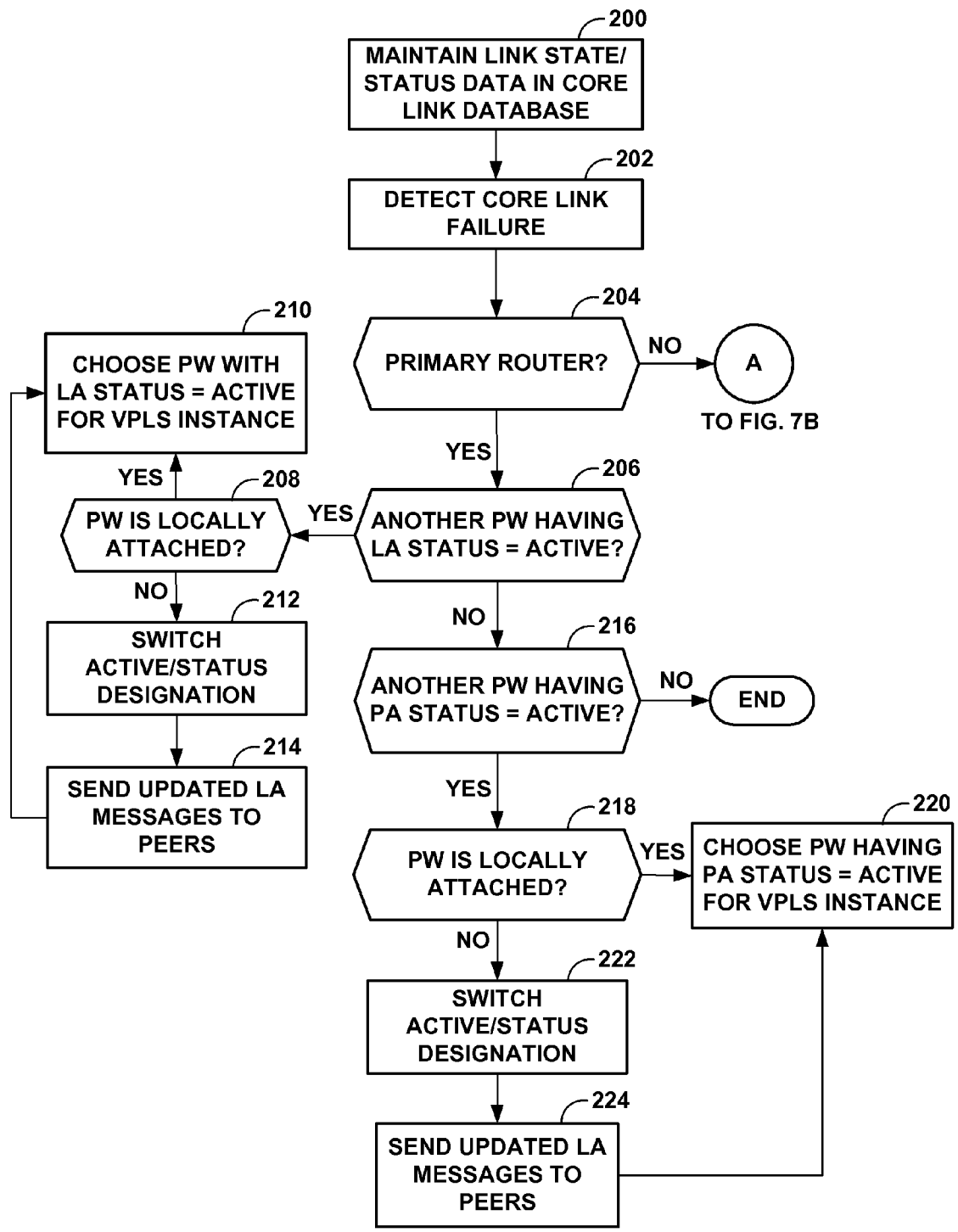
FIGS. 7A-7B include a flowchart that illustrates an exemplary operation of the network devices of FIG. 1 select, according to the techniques of this disclosure, a path through a network, upon failure of a core link, to maintain connectivity for end-to-end service data traffic.
Figure 7B:
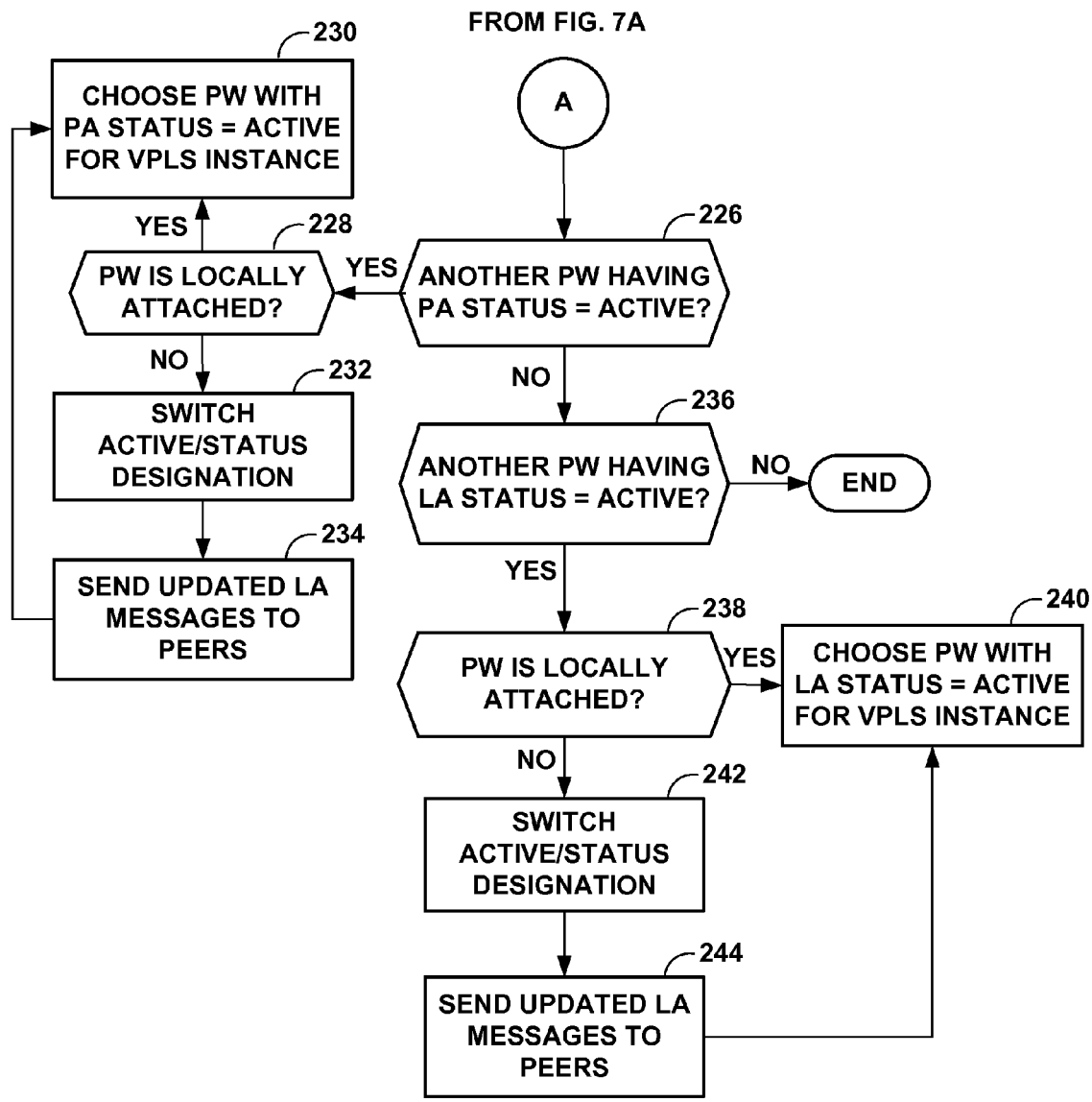

FIGS. 7A-7B include a flowchart that illustrates an exemplary operation of a router that performs the techniques of this disclosure to select a path through a network, upon failure of a core link, to maintain connectivity for end-to-end service data traffic. The exemplary operation is described with respect to exemplary router 50 of FIG. 3, operating as one of PE routers 16 of network system 2 of FIG. 6A. In some embodiments, steps of the exemplary operation described may be performed by elements of router 50 in an ordering that differs from the illustrated ordering.

Elements of connection protection module 86, including link advertiser 92, exchange module 96, and connection check module 88, receive link condition information from access link monitor 75 and other PE routers 16 of network system 2. These elements update core link database 94 to maintain an up-to-date representation of a topology of network system 2 (200).

CCM 88 determines that core link 20A is no longer capable of transporting service data for a service, e.g., a VPLS (202). If router 50 is a member of a primary multi-homing set (e.g., PE router 16C) (YES branch of 204), path selector 90 applies selection policies 98 to core link database 94 to determine one or more appropriate path selection actions that elements of CPM 86 are to perform as a result of the failure of core link 20A. Specifically, path selector 90 determines, from core link database 94, another one of core links 20 that has an LA status of active (YES branch of 206). If the determined core link is locally attached to router 50 (YES branch of 208), path selector 90 selects the core link and sets an identifier for the core link as active pseudowire 72 for the service (210). If, however, the determined core link is connected to another member of a multi-homing set (NO branch of 208), CPM 86 directs switch module 76 to perform an active/standby switch (212) and updates core link condition records in core link database 94 accordingly. Link advertiser 92 sends access link advertisement 32B to the core link 20B peer (i.e., PE router 16B) to advertise an updated status for access link 26C (214). Path selector 90 selects the core link having an LA status of active for the service and may set an identifier for the determined core link as active pseudowire 72 for the service (210).

In some topologies (for example, as illustrated in FIG. 6B), upon failure of a core link, core link database 94 of router 50 does not include a core link condition record that indicates another core link having an LA status of active (NO branch of 206). In such instances, path selector 90 of router 50, as a primary router, queries core link database for a core link having a PA status of active (216). If no core link condition record for such a core link is present in core link database 94 (NO branch of 216), router 50 may not be able to select a path through network 2, and the operation ends pending further updates to core link database 94. If, however, path selector 90 finds a core link condition record for a core link having a PA status of active (YES branch of 216), path selector 90 further determines whether the core link is attached to router 50 (218). If the core link is attached to router 50 (YES branch of 218), path selector 90 selects the core link having a PA status of active and sets an identifier for the core link as active pseudowire 72 for the service (220). If the core link is connected to another member of a multi-homing set (NO branch of 218), CPM 86 directs switch module 76 to perform an active/standby switch (222) and updates core link condition records in core link database 94 accordingly. Link advertiser 92 sends access a link advertisement to core link peers to advertise an updated status for access link connected to router 50 (224). Path selector 90 selects the core link having a PA status of active for the service and may set an identifier for the determined core link as active pseudowire 72 for the service (220). If all core links 20 have LA or PA active links set to down state, path selector 90 selects any operational one of core links 20.

If router 50 is a member of a secondary, rather than a primary, multi-homing set (e.g., PE router 16A) (NO branch of 204), path selector 90 applies selection policies 98 to core link database 94 to determine one or more appropriate path selection actions that elements of CPM 86 are to perform as a result of the failure of core link 20A. Specifically, path selector 90 determines, from core link database 94, another one of core links 20 that has a PA status of active (YES branch of 226). If the determined core link is locally attached to router 50 (YES branch of 228), path selector 90 selects the core link and sets an identifier for the core link as active pseudowire 72 for the service (230). If, however, the determined core link is connected to another member of a multi-homing set (NO branch of 228), CPM 86 directs switch module 76 to perform an active/standby switch (232) and updates core link condition records in core link database 94 accordingly. Link advertiser 92 sends an access link advertisement to any core link peers (e.g., PE router 16D) to advertise an updated status for access link 26A (234). Path selector 90 selects the core link having a PA status of active for the service and may set an identifier for the determined core link as active pseudowire 72 for the service (230). If all core links 20 have LA or PA active links set to down state, path selector 90 selects any operational one of core links 20.

If core link database 94 of router 50 does not include a core link condition record that indicates another core link having an LA status of active (NO branch of 226). In such instances, path selector 90 of router 50, as a secondary router, queries core link database for a core link having an LA status of active (236). If no core link condition record for such a core link is present in core link database 94 (NO branch of 236), router 50 may not be able to select a path through network 2, and the operation ends pending further updates to core link database 94. If, however, path selector 90 finds a core link condition record for a core link having a LA status of active (YES branch of 236), path selector 90 further determines whether the core link is attached to router 50 (238). If the core link is attached to router 50 (YES branch of 238), path selector 90 selects the core link having an LA status of active and sets an identifier for the core link as active pseudowire 72 for the service (240). If the core link is connected to another member of a multi-homing set (NO branch of 238), CPM 86 directs switch module 76 to perform an active/standby switch (242) and updates core link condition records in core link database 94 accordingly. Link advertiser 92 sends access a link advertisement to core link peers to advertise an updated status for access links connected to router 50 (244). Path selector 90 selects the core link having an LA status of active for the service and may set an identifier for the determined core link as active pseudowire 72 for the service (240). If all core links 20 have LA or PA active links set to down state, path selector 90 selects any operational one of core links 20.

Figure 8A:
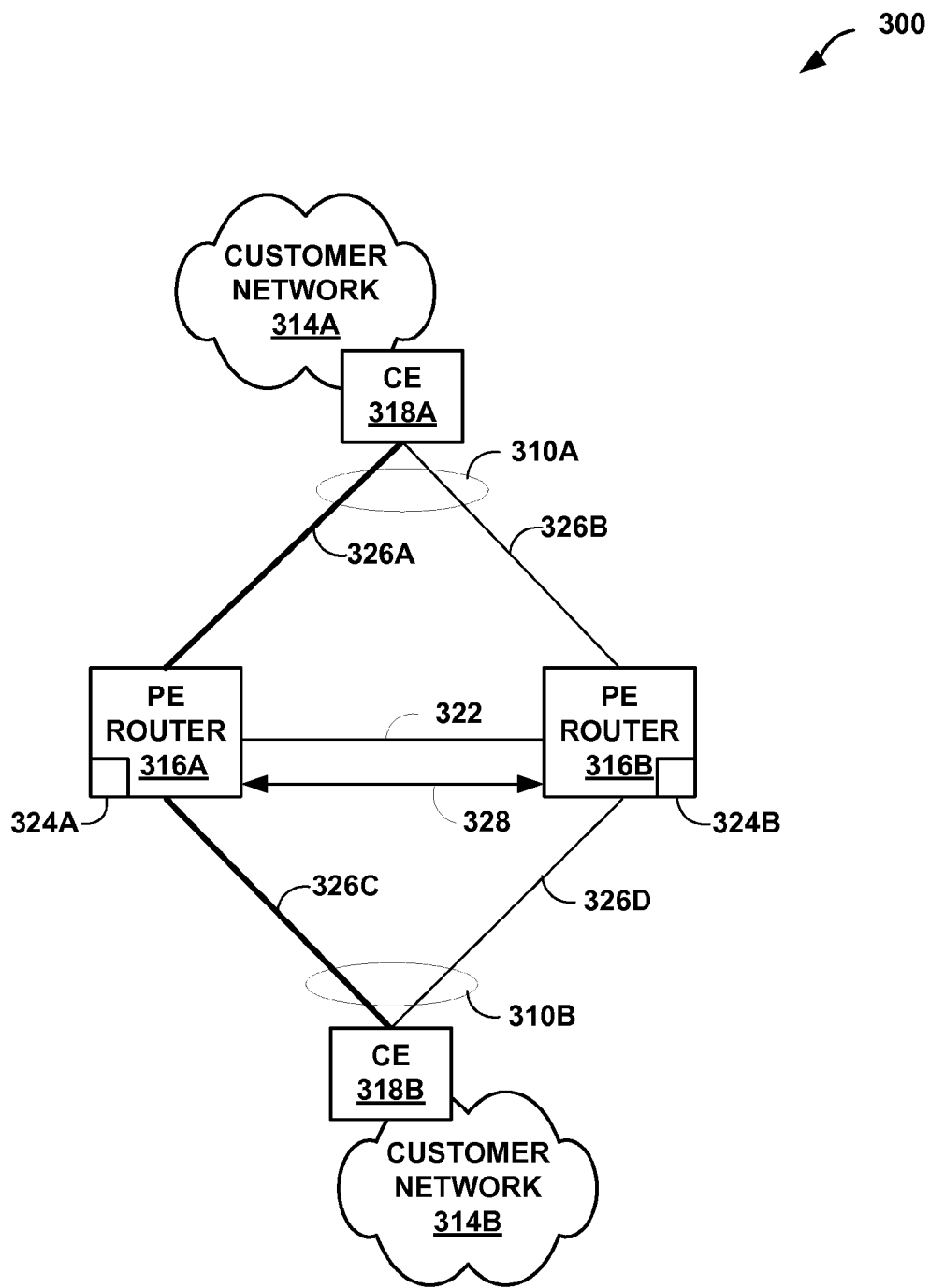
FIGS. 8A-8C are block diagrams illustrating an exemplary network system in which network devices perform the techniques described in this disclosure to bridge a plurality of multi-homed customer networks.

FIG. 8A is a block diagram illustrating network system 300 in which PE routers 316A-316B perform the techniques described in this disclosure to bridge a plurality of multi-homed customer networks. Network system 300 comprises a multi-homing set of PE routers 316A-316B ("PE routers 316") each connected to CE routers 318A and 318B and arranged in a triangle topology. CE router 318A multi-homes to PE routers 316A and 316B via respective access links 326A and 326B aggregated into a multi-chassis link aggregation group (MC-LAG) 310A. CE router 318B multi-homes to PE routers 316A and 316B via respective access links 326C and 326D aggregated into a multi-chassis link aggregation group (MC-LAG) 310B. PE routers 316 may be substantially similar to PE routers 16 of FIG. 1. Access links 326A-326D ("access links 326") may be substantially similar to access links 26 of FIG. 1. Network system 300 additionally includes customer networks 314A-314B ("customer networks 314") that may be substantially similar customer networks 14 of FIG. 1. PE routers 316 are coupled by protection-link (PL) 322 to enable data transport and signaling between the PE routers. PL 322 may be substantially similar to PLs 22 of FIG. 1. A service provider may offer a bridging (or switching) service offering interconnection to customer networks 314 via PE routers 316. The bridging service may be, for example, an L2VPN, a VPLS, or a virtual leased line (VLL).

PE router 316A is coupled to customer networks 314A and 314B via respective, active access links 326A and 326C (illustrated as heavy bolded lines), while PE router 316B couples to customer networks 314A and 314B via respective, standby access links 326B and 326D (illustrated as non-bolded lines). To enable a bridging service, PE router 316A comprises one or more forwarding entries or another mapping that stitch active access links 326A and 326C together to bridge customer networks 314. As a result, in the illustrated embodiment, service data traffic flows between CE routers 318 via access link 326A and 326C coupled to PE router 316A. PE routers 316 each monitor and store respective statuses and states (i.e., conditions) for each of access links 326 to which a respective one of PE routers 316 is connected. PE routers 316 exchange access link conditions via PL 322 using access link condition advertisements 328 sent via, e.g., ICCP.

PE routers 316 include respective connection protection modules 324A-324B ("CPMs 324") to perform techniques of this disclosure to enable end-to-end connection resiliency on a failure of one or more access links 326 and/or one of PE routers 316. CPMs 324 may be substantially similar to CPMs 24 described with respect to FIGS. 1-7.

Figure 8B:
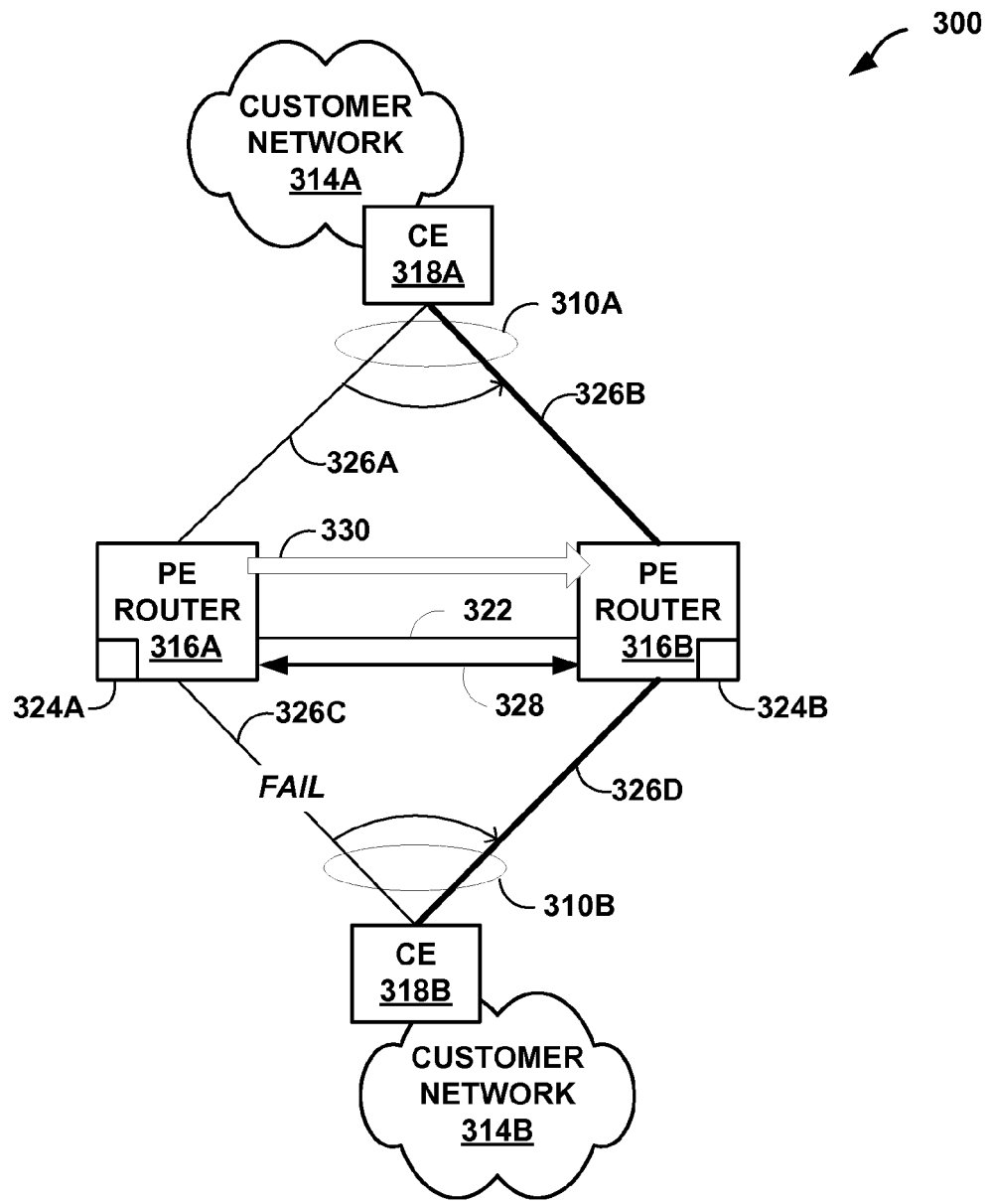

FIG. 8B is a block diagram illustrating an operation of CPMs 324 of PE routers 316 to select, in accordance with the techniques of this disclosure, a service data path through exemplary of network system 300 of FIG. 8A after a failure of access link 326C. PE router 316A detects an access link 326C failure. CPM 324A, responsive to the detected failure, applies path selection policies to access link 326 conditions to select a service data traffic forwarding path across PE routers 316 to bridge customer networks 318. In the illustrated embodiment, the path selection policies specify selection of access links that are in an up state and are both terminated by a particular one of PE routers 316. Because access links 326B and 326D satisfy this condition, CPM 324A directs PE router 316A to send switch directive 330 to cause PE router 316B to set access links 326B and 326D to active. In addition, CPM 324A directs PE router 316A to set access links 326A and 326C to standby. As a result, PE routers 316 maintain end-to-end resiliency for a bridging service that connects customer networks 314.

In some embodiments, path selection policies specify an active/standby switch determination conditioned upon a comparison of the number of services having an up state and operating over respective active and standby links. In some embodiments path selection policies specify an active/standby switch determination conditioned upon a priority comparison, or meeting a priority threshold, for a failed service and/or other service operating over an active link.

Figure 8C:
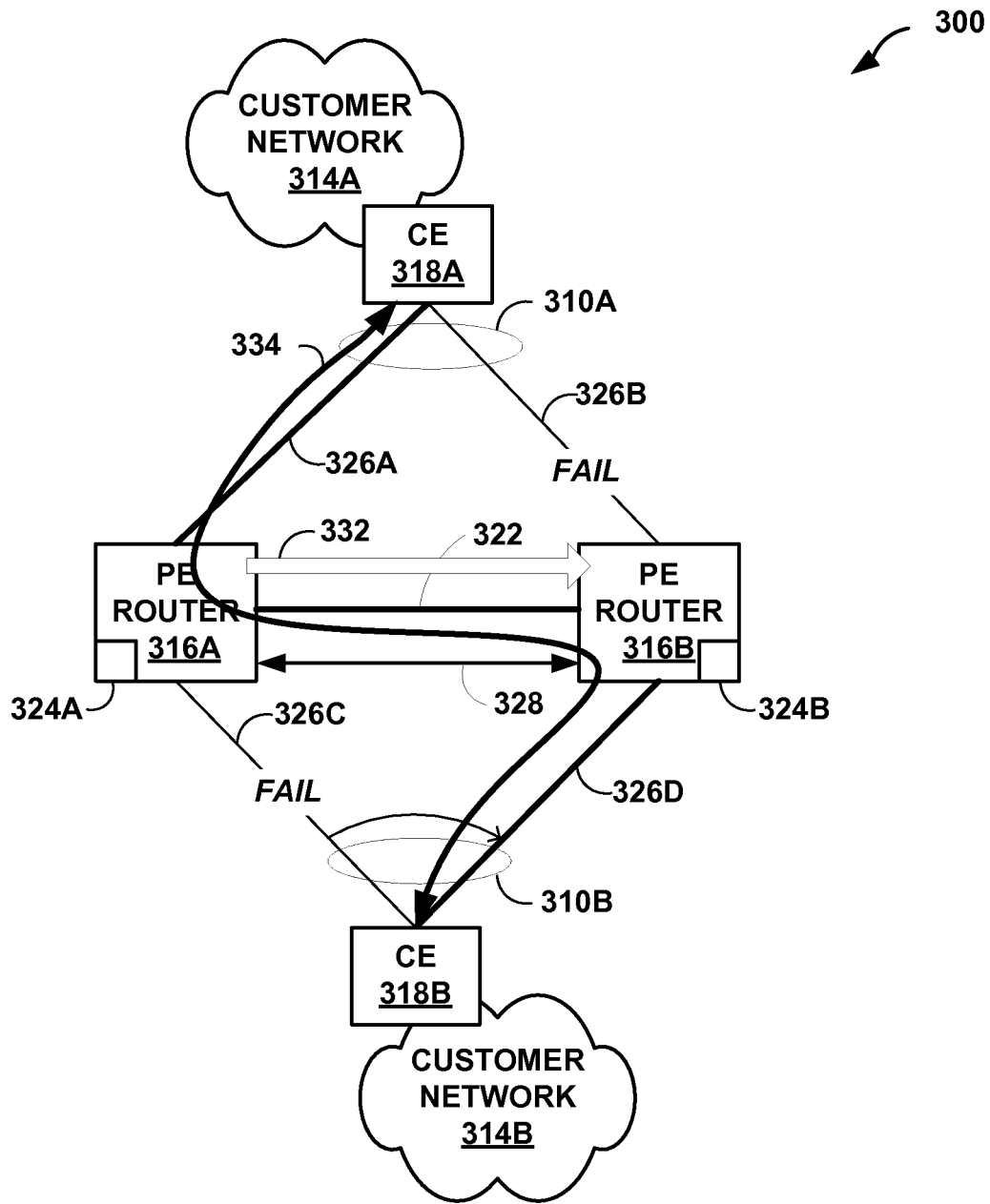

FIG. 8C is a block diagram illustrating an operation of CPMs 324 of PE routers 316 to select, in accordance with the techniques of this disclosure, a service data path through exemplary of network system 300 of FIG. 8A after a failure of access links 326B and 326C. PE router 316A detects an access link 326C failure. Moreover, PE router 316B detects an access link 326B failure. PE routers 316 exchange access link conditions via PL 322. PE router 316A applies path selection policies to access link 326 conditions to select a service data traffic forwarding path across PE routers 316 to bridge customer networks 318. The path selection policies specify priority selection of access links that are in an up state and are both terminated by a particular one of PE routers 316. No combination of access links 326 in the illustrated embodiment satisfies this condition. The path selection policies additionally specify selection of access links that are in an up state and coupled to respective PE routers that are interconnected via a PL link. In this instance, access links 326A and 326D satisfy this condition.

CPM 324A therefore directs PE router 316A to send switch directive 332 to cause PE router 316B to set access link 326D to active. In addition, PE routers 316 install forwarding entries for the service to cause PE routers 316 to forward service data traffic 334 over PL 322 (illustrated as a heavy bolded line). In this way, PE routers 316 cooperate to maintain end-to-end resiliency for a layer two (L2) service that connects customer networks 314. In some instances, PE routers 316 utilize PL 322 only when a higher-priority service must traverse access link 326A or 326C, or if access link 326A or 326C has more operation services than 326B and/or 326D.

Figure 9:
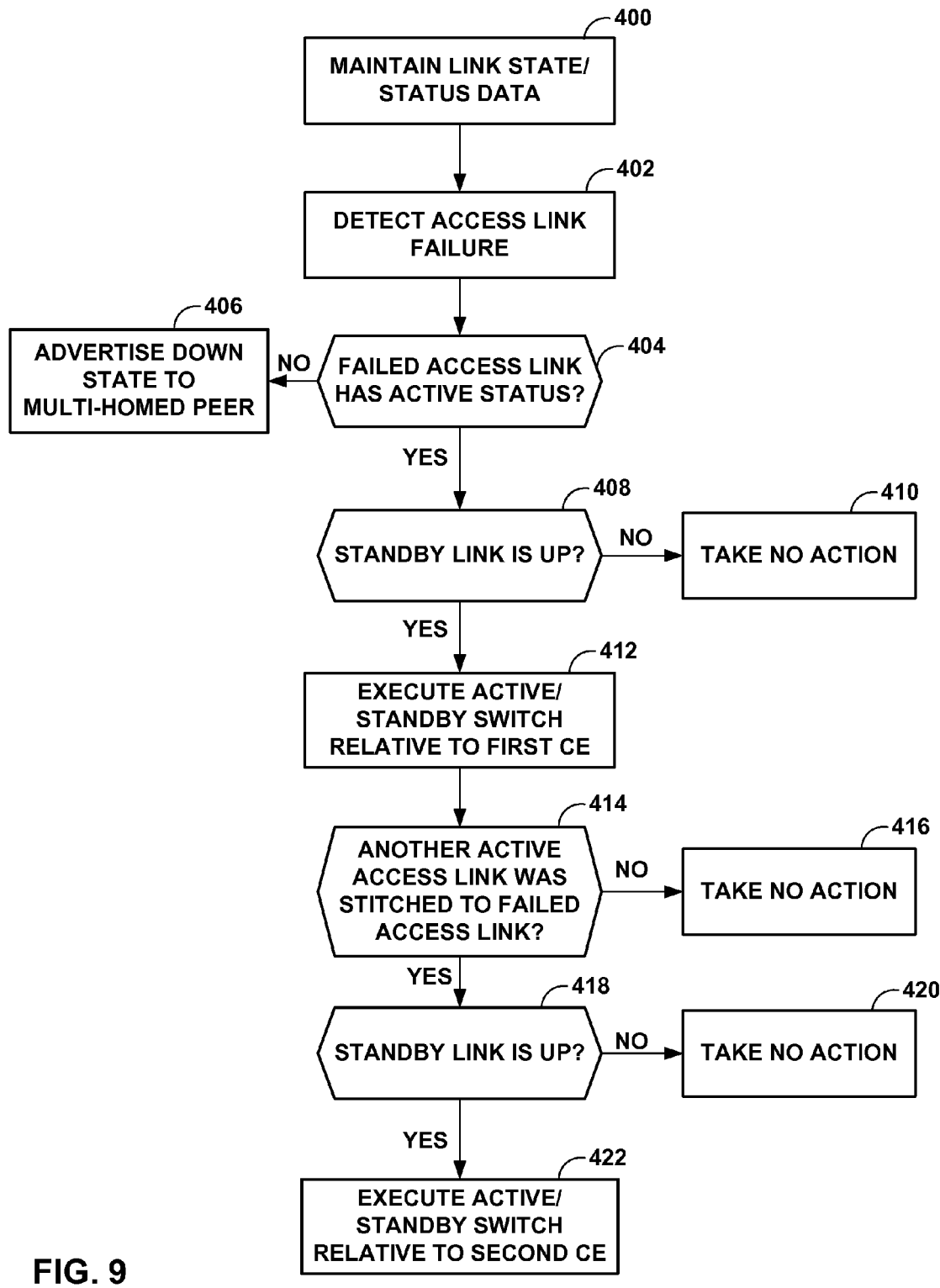
FIG. 9 is a flowchart illustrating an exemplary operation of one of the network devices of FIGS. 8A-8C that performs the techniques of this disclosure to select a data path, upon failure of an access link, to maintain connectivity for end-to-end service data traffic in the network system.

FIG. 9 is a flowchart illustrating an exemplary operation of a router that performs the techniques of this disclosure to select a data path, upon failure of an access link, to maintain connectivity for end-to-end service data traffic. The exemplary operation is described with respect to exemplary router 50 of FIG. 3, operating as PE routers 316A of network system 300 of FIG. 8A. In some embodiments, steps of the exemplary operation described may be performed by elements of router 50 in an ordering that differs from the illustrated ordering.

Access link monitor 75 monitors and stores state and status information for access links connected to a multi-homing set (400). Multi-homing module 70 exchanges access link condition advertisements 328 with other PE routers 316 in a multi-homing set to obtain an up-to-date representation of a topology and link conditions for network system 300. Access link monitor 75 detects a failure of access links 326C (402) and determines, from an access link condition record for the access link, whether the failed access link has a status of active (404). If the access link is not an active link (NO branch of 404), multi-homing module 70 sends an access link condition advertisement 328 to the PE router 316B (406).

For active, failed access links (YES branch of 404), path selector 90 applies path selection policies 98 to access link condition records maintained by access link monitor 75 to select a new service data traffic path over network 300 that bridges customer networks 318. Path selector 90 determines whether standby access link 326D has an up state (408). If not (NO branch of 408), there are no available links to bridge customer network 318 and path selector 90 takes no further action (410).

When a standby link is up (YES branch of 408), path selector 90 directs switch module 76 to send a switch directive to PE router 316B to perform an active/standby switch (412) for access links 326A and 326B. Switch module 76 designates failed access link 326A as standby, and PE router 316B toggles the standby access link 326B to active. If router 50 has stitched, using a forwarding entry or another mapping, together failed access link 326C with an active access link connected to CE router 318A (YES branch of 414) and standby access link 326B has an up state (YES branch of 418), path selector 90 directs switch module 76 to send a switch directive to PE router 316B to perform an active/standby switch for access links 326C and 326D. Switch module 76 designates the access link 326C as standby, and PE router 316B toggles the current standby access link to active (422). In some instances, PE routers 316 utilize PL 322 only when a higher-priority service must traverse access link 326A or 326C, or if access link 326A or 326C has more operation services than 326B and/or 326D.

In performing the techniques in this manner, PE router 316A maintains end-to-end resiliency for a bridging service that connects customer networks 314.

Figure 10A:
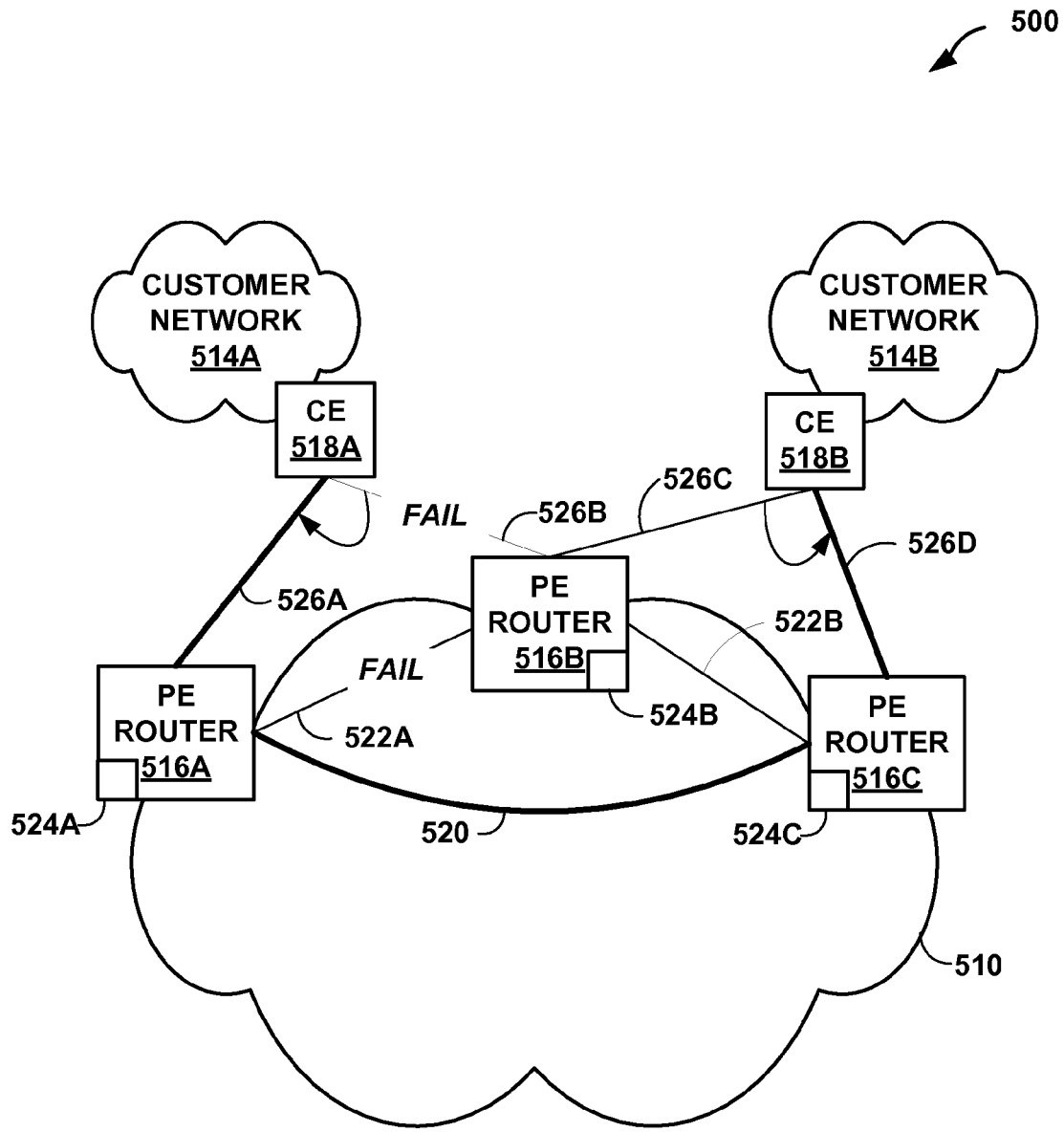
FIGS. 10A-10B are block diagrams illustrating an exemplary network system in which network devices perform the techniques described in this disclosure to connect a plurality of multi-homed customer networks.

FIG. 10A is a block diagram illustrating network system 500 in which PE routers 316A-316C perform the techniques described in this disclosure to select a data path to connect a plurality of multi-homed customer networks that participate in a service offered by or lease a portion of service provider network 510. Network system 500 comprises CE router 518A that multi-homes to PE routers 516A and 516B via respective access links 526A and 526B. CE router 318B similarly multi-homes to PE routers 516A and 516B via respective access links 526C and 526D. PE routers 516 may be substantially similar to PE routers 16 of FIG. 1 and/or PE routers 316 of FIGS. 8A-8C. Access links 526A-526D ("access links 526") may be substantially similar to access links 26 of FIG. 1. Network system 500 additionally includes customer networks 514A-514B ("customer networks 514") that may be substantially similar customer networks 14 of FIG. 1. PE routers 516A and 516B are coupled by protection-link (PL) 522A to enable data transport and signaling between the PE routers. PE routers 516B and 516C are coupled by protection-link (PL) 522B to enable data transport and signaling between the PE routers. PLs 522A and 522B may be substantially similar to PLs 22 of FIG. 1. A service provider may offer a bridging service offering interconnection to customer networks 514 via PE routers 516. The service provider may also offer a service (e.g., VPLS) running over SP network 510 or lease a portion of SP network 510 to enable customer networks 514 to interconnect.

PE router 516A is coupled to customer network 514A access link 526A, while PE router 516C couples to customer network 514B via access links 526D. PE router 516B couples to customer networks 514A and 514B via respective access links 526B and 526C. To enable a bridging service, PE router 516B comprises one or more forwarding entries or another mapping that stitch access links 526B and 526C together to bridge customer networks 514. As a result, in the illustrated embodiment, service data traffic may flow between CE routers 518 via access link 526B and 526C coupled to PE router 516A. PE routers 516A and 516C are coupled with core link 520, which may be substantially similar to any of core links 20 of FIG. 1. Each of PE routers 516 monitor and store conditions for each of access links 526 and each of PLs 522 to which the PE router is connected.

PE routers 516 comprise respective connection protection modules 524A-524C to perform techniques of this disclosure to enable end-to-end connection resiliency on a failure of one or more access links 526 and/or one of PE routers 516. CPMs 524 may be substantially similar to CPMs 24 described with respect to FIGS. 1-7 and/or CPMs 324 described with respect to FIGS. 8A-8C.

In the illustrated embodiment, active access link 526B and PL 522A fail and are no longer able to transport service data traffic between customer networks 514. CPM 524B of PE router 516B and, to maintain an end-to-end connection between customer networks 514, applies path selection policies to cause PE router 516B to perform an active/standby switch for access links 526A and 526B. PE router 516B advertises the failure of access link 526B to PE router 516A via SP network 510. In addition, CPM 524 detects the failure of PL 522A and applies path selection policies to cause PE router 516A to select core link 520 to forward service data traffic received via newly activated access link 526A. PE router 516A additionally forwards service data traffic received via core link 520 via activate access link 526A.

CPM 524B additionally performs an active/standby switch with PE router 516C for access links 526C and 526D. As a result, PE router 516C activates access link 526D. CPM 524B advertises the failure of PL 522A and 526B to PE router 516C. CPM 524C applies path selection policies to select core link 520 to forward service data traffic received via newly activated access link 526D. PE router 516C additionally forwards service data traffic received via core link 520 via activate access link 526D.

Figure 10B:
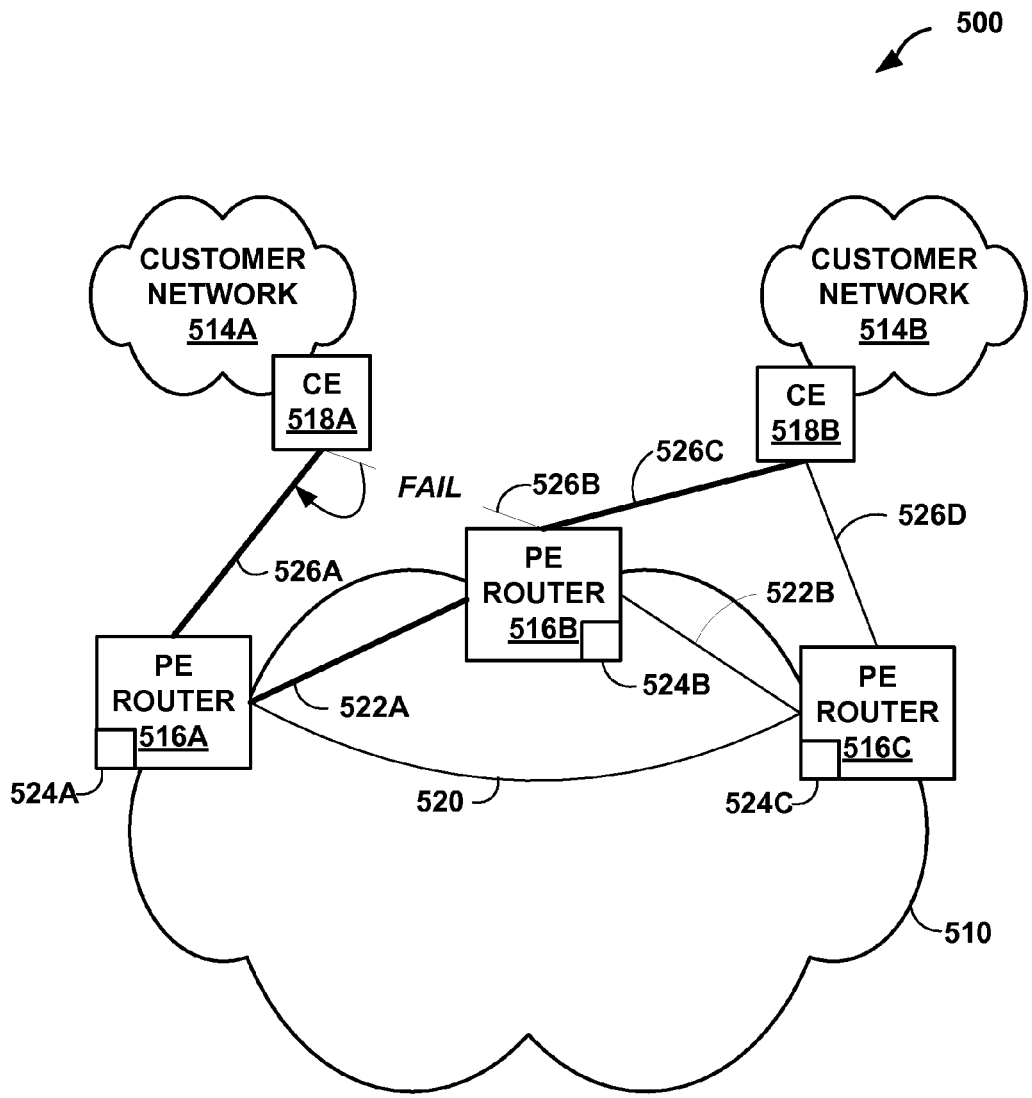

FIG. 10B is a block diagram illustrating network system 500 of FIG. 10A modified to include PL 522A as a function link. At an initial state, PE router 516B bridges customer networks 514 via active access links 526B and 526C. Upon failure of access link 526B, CPM 524B performs an active/standby switch for access links 526A and 526B to set access link 526 as the active access link for the multi-homing set. PE router 516B advertises the failure of access link 526B to PE router 516A. CPM 524A applies path selection policies to cause PE router 516A to forward service data traffic received via newly activated access link 526A to PE router 516B via PL 522A. Service data traffic between customer networks 514 thus traverses a forwarding path that includes access links 526A and 526C and PL 522A.

Figure 11:
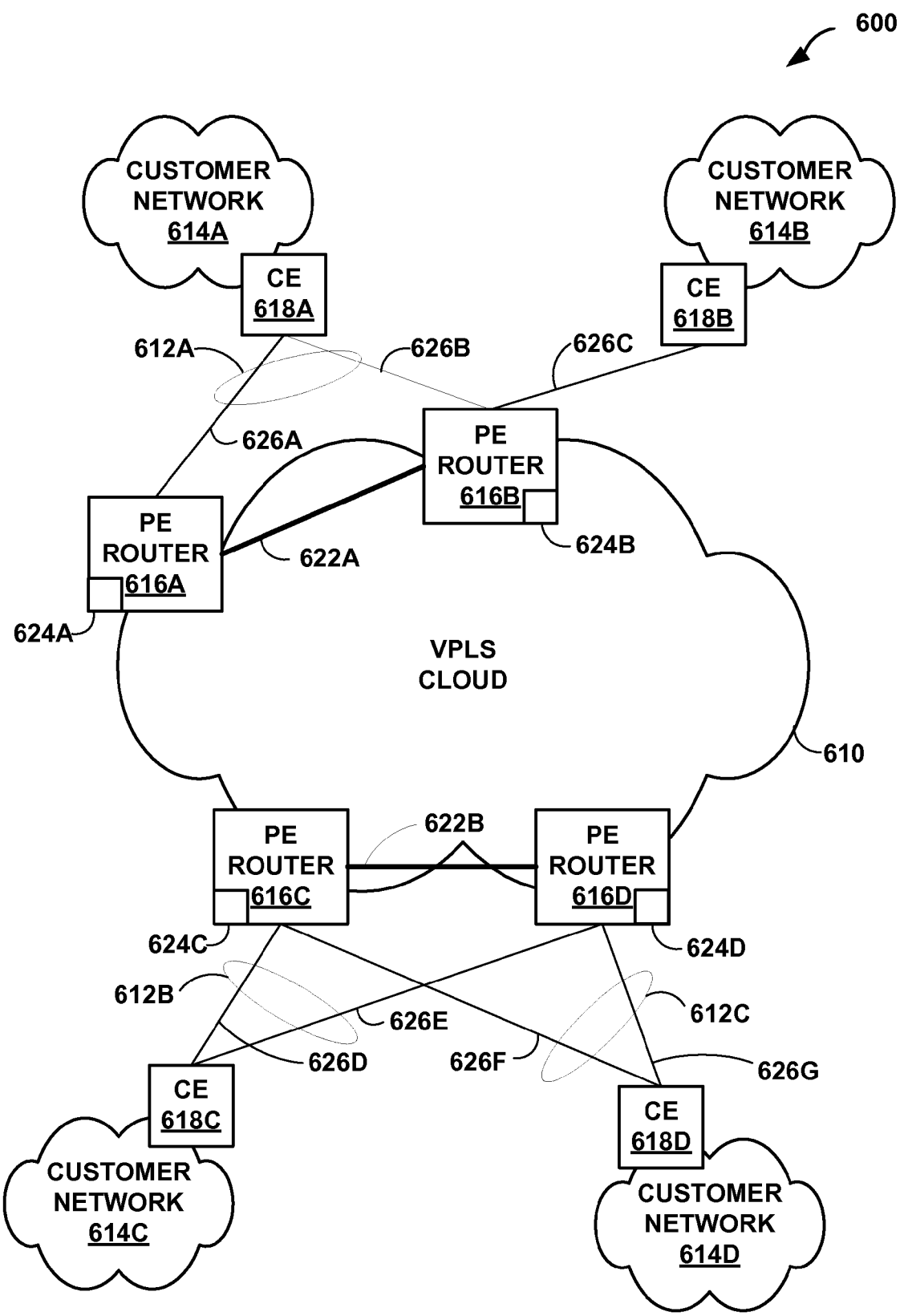
FIG. 11 is a block diagram illustrating a network system in which PE routers perform the techniques described in this disclosure to determine whether to perform active/standby switching of multi-homing sets that provide a VPLS instance to customer networks.

FIG. 11 is a block diagram illustrating network system 600 in which PE routers 616A-616D perform the techniques described in this disclosure to determine whether to perform active/standby switching of multi-homing sets that provide a VPLS instance to customer networks 614A-614D. CE router 618A multi-homes to PE routers 616A and 616B via respective access links 626A and 626B aggregated into a multi-chassis link aggregation group (MC-LAG) 612A. CE router 618B is connected to PE router 616B via access link 626C. CE router 618C multi-homes to PE routers 616C and 616D via respective access links 626D and 626E aggregated into a multi-chassis link aggregation group (MC-LAG) 612B. CE router 618D also multi-homes to PE routers 616C and 616D via respective access links 626F and 626G aggregated into a multi-chassis link aggregation group (MC-LAG) 612C.

PE routers 616 may be substantially similar to PE routers 16 of FIG. 1 and/or PE routers 316 of FIGS. 8A-8C. Access links 626A-626G may be substantially similar to access links 26 of FIG. 1. Customer networks 614 may be substantially similar to customer networks 14 of FIG. 1. PE routers 616A and 616B are coupled by protection-link (PL) 622A to enable data transport and signaling between the PE routers. PE routers 616C and 616D are coupled by protection-link (PL) 622B to enable data transport and signaling between the PE routers. PLs 622A-622B may be substantially similar to PLs 22 of FIG. 1.

PE routers 616 are members of a VPLS domain to interconnect customer networks 614 in a multipoint-to-multipoint link configuration using the VPLS cloud of network 610. That is, PE routers 16 interconnect with pseudowires or physical links that traverse network 610 so as to provide a VPLS instance by which customer networks 614 may exchange L2 data traffic.

In accordance with the techniques of this disclosure, upon failure of a service (core-facing) link of network 610 (not shown), respective CPMs 624 of PE routers 616 determine whether to switch a designation of the one or more multi-homing sets connected to the failed link. Specifically, for example, CPM 624C, upon failure of a service link connected to active PE router 616C for MC-LAG 612B, counts the number of connected service links that have active status and are in the up state for both active PE router 616C and standby PE router 616D. When the number of active, up service links for the active PE router 616C is less than the number for backup PE router 616D, CPM 624C initiates an active/standby switch. Alternatively, CPM 624C may initiate an active/standby switch when the priority of the service that had been operating over the failed service link is higher than other services operating over the active access link of MC-LAG 612B and is also operational over the standby access link of MC-LAG 612B. CPM 624C may also initiate an active/standby switch when the service that had been operating over the failed service link is also operational on the standby access link of MC-LAG 612B. In some instances, services have the same priority, in which case CPM 624C initiates an active/standby switch based on a comparison of the respective number of services operating on the standby access link versus the active access link of MC-LAG 612B.

Otherwise, CPM 624C and 624D may cooperate to cause data traffic that previously flowed over the failed service link to traverse PL 622B from PE router 616D to PE router 616C. In the event of a failure of one of access links 626, PE routers 616 operate in a manner substantially similar to that described above with respect to PE routers 16 of FIG. 1 upon failure of one of access links 26.

The techniques described in this disclosure may be implemented, at least in part, in hardware, software, firmware or any combination thereof. For example, various aspects of the described techniques may be implemented as encoded program code executed by one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a tangible computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
   storing a plurality of access link condition records with a first router that is a member of a first multi-homing set of a plurality of routers each connected to a first layer two (L2) network with a respective one of a plurality of first access links, wherein the first multi-homing set communicates with a second L2 network using a plurality of second access links to provide a first service to the first and second L2 networks, wherein each access link condition record comprises a state field that denotes whether a corresponding access link is operational with respect to the first service and a status field that denotes whether the corresponding access link is designated as active for transporting first service data traffic, wherein the plurality of access link condition records stored by the first router includes a corresponding access link condition record for each of the first access links and for each of the second access links;
   detecting, with the first router, a failure of a service link that connects the first and second L2 networks; and
   in response to detecting the failure, applying a path selection policy with the first router to select a data path between the first and second L2 networks for the first service data traffic and to cause one of the plurality of routers in the first multi-homing set to switch a status of at least one of the first access links or one of the second access links to active.

2. The method of claim 1,
   wherein the first service is a bridging service and the plurality of routers in the first multi-homing set bridge the first and second L2 networks by bridging first service data traffic between the active one of the first access links and the active one of the second access links,
   wherein the failed service link is one of the first access links or second access links, and
   wherein applying a path selection policy with the first router comprises applying the path selection policy to the access link condition records.

3. The method of claim 1,
   wherein a protection link connects the first router to a second one of the plurality of routers in the first multi-homing set, and
   wherein applying the path selection policy with the first router causes the first router to send first service data traffic to the second router via the protection link.

4. The method of claim 1,
   wherein the first access links form a first multi-chassis link aggregation group and the second access links form a second multi-chassis link aggregation group, and
   wherein applying the path selection policy with the first router causes the first multi-homing set to switch a status of one of the first access links to active and to switch a status of one of the second access links to active.

5. The method of claim 1,
   wherein a plurality of core links of a layer three (L3) network interconnect the plurality of routers in the first multi-homing set to a plurality of routers in a second multi-homing set, wherein each router in the second multi-homing set is connected to the second L2 network with a respective one of the plurality of second access links, wherein one of the core links is designated active for transporting first service data traffic, and further comprising:

storing a plurality of core link condition records with the first router, wherein each core link condition record comprises a state field that denotes whether a corresponding one of the core links is operational with respect to the first service, a locally advertised field that denotes a status of one of the first access links that connects to a router in the first multi-homing set that is connected to the corresponding one of the core links, and a peer advertised field that denotes a status of one of the second access links that connects to a router in the second multi-homing set that is connected to the corresponding one of the core links, wherein applying a path selection policy comprises applying the path selection policy to the core link condition records.

6. The method of claim 5, detecting, with the first router, a failure of a service link comprises detecting a failure of one of the core links.

7. The method of claim 5, further comprising:

sending, with the first router, a first access link advertisement via each one of the core links that is connected to the first router, wherein the first access link advertisement indicates a status of one of the first access links that connects to the first router;

receiving, with the first router, a second access link advertisement via a first one of the core links that is connected to the first router, wherein the second access link advertisement indicates a status of one of the second access links that connects to one of the routers in the second multi-homing set that connects to the first one of the core links; and updating a peer advertised field in a corresponding one of the core link condition records for the first core link with the status indicated in the second access link advertisement.

8. The method of claim 7, wherein applying the path selection policy comprises applying the path selection policy in response to receiving the second access link advertisement.

9. The method of claim 5, wherein the core links interconnect the plurality of routers in the first multi-homing set to the plurality of routers in the second multi-homing set in a partial mesh.

10. The method of claim 5, further comprising:

sending, with the first router, one or more of the core link condition records to other routers in the first multi-homing set;

receiving, with the first router, one or more updated core link condition records from the other routers in the first multi-homing set; and updating the core link condition records stored by the first router with the updated core link condition records.

11. The method of claim 5, wherein applying a path selection policy with the first router to select a data path between the first and second L2 networks for the first service data traffic comprises applying a path selection policy to the core link condition records to select one of the core links to activate for transporting first service data traffic.

12. The method of claim 11, wherein the first multi-homing set is a primary multi-homing set, and wherein the path selection policy prioritizes, for selection by routers that are members of the primary multi-homing set, core links that correspond to core link condition records having a locally advertised field set to active status, and further comprising:

selecting one of the core links corresponding to a first one of the core link condition records to activate for transporting first service data traffic when the first core link condition record has a locally advertised field set to active status.

13. The method of claim 12, wherein applying a path selection policy with the first router to select a data path cause one of the plurality of routers in the first multi-homing set to switch a status of at least one of the first access links or second access links to active comprises switching to active a status of a standby one of the first access links that connects to one of the routers in the first multi-homing that is also connected to the selected core link.

14. The method of claim 11, wherein the first multi-homing set is a secondary multi-homing set, and wherein the path selection policy prioritizes, for selection by routers that are members of the secondary multi-homing set, core links that correspond to core link condition records having a peer advertised field set to active status, and further comprising:

selecting one of the core links corresponding to a first one of the core link condition records to activate to transport first service data traffic when the first core link condition record has a peer advertised field set to active status.

15. The method of claim 14, wherein applying a path selection policy with the first router to select a data path cause one of the plurality of routers in the first multi-homing set to switch a status of at least one of the first access links or second access links to active comprises switching to active a status of a standby one of the first access links that connects to one of the routers in the first multi-homing that is also connected to the selected core link.

16. The method of claim 12, wherein the first access links form a first multi-chassis link aggregation group having a first group identifier and the second access links form a second multi-chassis link aggregation group having a second group identifier, and further comprising determining, with the first router, that the first multi-homing set is the primary multi-homing set by comparing the first group identifier and second group identifier and selecting the greater identifier.

17. The method of claim 1, wherein the first multi-homing set communicates with a second L2 network to provide a second service to the first and second L2 networks, wherein applying a path selection policy with the first router causes one of the plurality of routers in the first multi-homing set to switch a status of at least one of the first access links or second access links to active only when the first service has a higher priority than the second service.

18. The method of claim 1, further comprising:

comparing a number of services operating over each of the first access links, wherein applying a path selection policy with the first router causes one of the plurality of touters in the first multi-homing set to switch a status of at least one of the first access links to active only when a standby one of the first access links is transporting data traffic for a fewer number of services than an active one of the first access links.

19. The method of claim 1, wherein the first service is a VPLS instance.

20. A first router that is a member of a first multi-homing set of a plurality of routers in a layer three (L3) network each connected to a first layer two (L2) network with a respective one of a plurality of first access links to provide a first service to the first L2 network, wherein the first router comprises:
- a pseudowire setup module to establish one or more core links to interconnect the plurality of routers in the first multi-homing set to one or more routers of a plurality of routers in the L3 network in a second multi-homing set, wherein each router in the second multi-homing set is connected to the second L2 network with a respective one of a plurality of second access links, wherein one of the core links has an active status to transport first service data traffic;
- an access link monitor to store a plurality of access link condition records, wherein each access link condition record comprises a state field that denotes whether a corresponding access link is operational with respect to the first service and a status field that denotes whether the corresponding access link is designated active for transporting the first service data traffic, wherein the plurality of access link condition records stored by the access link monitor includes a corresponding access link condition record for each of the first access links and for each of the second access links;
- a core link database to store a plurality of core link condition records, wherein each core link condition record comprises a state field that denotes whether a corresponding one of the core links is operational with respect to the first service, a locally advertised field that denotes a status of one of the first access links that connects to a router in the first multi-homing set that is connected to the corresponding one of the core links, and a peer advertised field that denotes a status of one of the second access links that connects to a router in the second multi-homing set that is connected to the corresponding one of the core links;
- a connection check module to detect failures of one or more of the core links connected to the first router and to set the state fields of core link condition records in core link database that correspond to the failed core links to a down value;
- a path selection policy;
- a plurality of interface cards to send and receive packets;
- a switch module to switch a status of one of the first access links to activate to transport first service data traffic; and
- a path selector to apply the path selection policy,
- wherein the connection check module detects a failure of one of the core links, and
- wherein the path selector, in response the failure, applies the path selection policy to the core link database to select one of the core links to activate to transport first service data traffic and to direct the switch module to switch to active a status of one of the first access links that connects to the router in the first multi-homing set that connects to the selected core link.

21. The first router of claim 20, further comprising:
- an exchange module to send core link condition records to other routers of the first multi-homing set and to update core link database with updated core link condition records received from the other routers of the first multi-homing set.

22. The first router of claim 20,
- wherein a protection link connects the first router to a second one of the plurality of routers in the first multi-homing set, and
- wherein the path selector applies the path selection policy to cause the first router to send first service data traffic to the second router via the protection link.

23. The first router of claim 20, further comprising a link advertiser to: send a first access link advertisement via each one of the core links that is connected to the first router, wherein the first access link advertisement indicates a status of one of the first access links that connects to the first router;
- receive a second access link advertisement via a first one of the core links that is connected to the first router, wherein the second access link advertisement indicates a status of one of the second access links that connects to one of the routers in the second multi-homing set that connects to the first one of the core links; and
- update a peer advertised field in a corresponding one of the core link condition records for the first core link with the status indicated in the second access link advertisement.

24. The first router of claim 23, wherein the path selector applies the path selection policy in response to the link advertiser receiving the second access link advertisement.

25. The first router of claim 20,
- wherein the first multi-homing set is a primary multi-homing set, and wherein the path selection policy prioritizes, for selection by routers that are members of the primary multi-homing set, core links that correspond to core link condition records having a locally advertised field set to active status, and
- wherein the path selector applies the path selection policy to select one of the core links corresponding to a first one of the core link condition records to activate to transport first service data traffic when the first core link condition record has a locally advertised field set to active status.

26. The first router of claim 25, wherein the switch module, to switch a status of one of the first access links to activate to transport first service data traffic, switches to active a status of a standby one of the first access links that connects to one of the routers in the first multi-homing that is also connected to the selected core link.

27. The first router of claim 20,
- wherein the first multi-homing set is a secondary multi-homing set, and wherein the path selection policy prioritizes, for selection by routers that are members of the secondary multi-homing set, core links that correspond to core link condition records having a peer advertised field set to active status, and
- wherein the path selector applies the path selection policy to select one of the core links corresponding to a first one of the core link condition records to activate to transport first service data traffic when the first core link condition record has a peer advertised field set to active status.

28. The first router of claim 27, wherein the switch module, to switch a status of one of the first access links to activate to transport first service data traffic, switches to active a status of a standby one of the first access links that connects to one of the routers in the first multi-homing that is also connected to the selected core link.

29. A system comprising:
- a first layer two (L2) network;
- a second L2 network;
- a first multi-homing set comprising a plurality of routers in a layer three (L3) network, wherein each of the plurality of routers is connected to the first L2 network with a respective one of a plurality of first access links to provide a first service to the first L2 network;
- a second multi-homing set comprising a plurality of routers in a L3 network, wherein each of the plurality of routers is connected to the second L2 network with a respective one of a plurality of second access links to provide the first service to the second L2 network; and a plurality of core links to interconnect the plurality of routers in the first multi-homing set with the plurality of routers in the second multi-homing set, wherein a first router in the first multi-homing set comprises a first core link database to store a plurality of core link condition records, wherein each core link condition record comprises a state field that denotes whether a corresponding one of the core links is operational with respect to the first service, a locally advertised field that denotes a status of one of the first access links that connects to a router in the first multi-homing set that is connected to the corresponding one of the core links, and a peer advertised field that denotes a status of one of the second access links that connects to a router in the second multi-homing set that is connected to the corresponding one of the core links, wherein the first router in the first-multihoming set stores a plurality of access link condition records, wherein each access link condition record comprises a state field that denotes whether a corresponding access link is operational with respect to the first service and a status field that denotes whether the corresponding access link is designated as active for transporting first service data traffic, wherein the plurality of access link condition records stored by the first router includes a corresponding access link condition record for each of the first access links and for each of the second access links, wherein, upon failure of a first one of the core links, the first router selects one of the core links to activate to transport first service data traffic when the core link condition record in the first core link database corresponding to the selected core link has a locally advertised field set to active status, and switches to active a status of a standby one of the first access links that connects to one of the routers in the first multi-homing that is also connected to the selected core link, wherein a second router in the second multi-homing set comprises a second core link database to store a plurality of core link condition records, and wherein, upon failure of the first one of the core links, the second router selects the core link selected by the first router to activate to transport first service data traffic when the core link condition record in the second core link database corresponding to the selected core link has a peer advertised field set to active status.

* * * * *